US007862424B2

(12) United States Patent
Walker et al.

(10) Patent No.: US 7,862,424 B2
(45) **Date of Patent: *Jan. 4, 2011**

(54) METHODS AND APPARATUS FOR FACILITATING A FLAT RATE PLAY SESSION AND FOR EXTENDING SAME

(75) Inventors: Jay S. Walker, Ridgefield, CT (US); Thomas M. Sparico, Hoboken, NJ (US); James A. Jorasch, New York, NY (US); Robert C. Tedesco, Fairfield, CT (US); Magdalena M. Fincham, Ridgefield, CT (US)

(73) Assignee: IGT, Reno, NV (US)

( * ) Notice: Subject to any disclaimer, the term of this patent is extended or adjusted under 35 U.S.C. 154(b) by 1225 days.

This patent is subject to a terminal disclaimer.

(21) Appl. No.: 11/254,352

(22) Filed: Oct. 20, 2005

(65) Prior Publication Data

US 2006/0035701 A1 Feb. 16, 2006

Related U.S. Application Data

(63) Continuation-in-part of application No. 10/001,089, filed on Nov. 2, 2001, now Pat. No. 7,140,964, which is a continuation-in-part of application No. 09/518,760, filed on Mar. 3, 2000, now Pat. No. 6,319,127, which is a continuation of application No. 08/880,838, filed on Jun. 23, 1997, now Pat. No. 6,077,163.

(51) Int. Cl.
*A63F 13/00* (2006.01)

(52) U.S. Cl. .......................................... 463/25; 463/20

(58) Field of Classification Search .................. 463/20, 463/25

See application file for complete search history.

(56) References Cited

U.S. PATENT DOCUMENTS 4,363,485 A 12/1982 Edwall (Continued)

OTHER PUBLICATIONS

Grochowski, John, "Computers Help Players Learn Winning Strategy", Chicago Sun-Times, Jun. 30, 1995, Section: Weekend Plus, Gaming, p. 13, NC.

(Continued)

*Primary Examiner*—Peter DungBa Vo
*Assistant Examiner*—William H McCulloch
(74) *Attorney, Agent, or Firm*—K&L Gates LLP

(57) ABSTRACT

The present invention is directed generally to a method and apparatus for operating a gaming device having a flat rate play session costing a flat rate price. The flat rate play session spans multiple plays on the gaming device over a pre-established duration. The gaming device identifies price parameters and determines the flat rate price of playing the gaming device based on those price parameters. In one embodiment, identifying price parameters includes receiving player selected price parameters. In another embodiment, price parameters further incorporate operator selected price parameters. Should the player decide to pay the flat rate price, the player simply deposits the necessary funds into the gaming device or makes a credit account available for the gaming device to debit. Once the player initiates play, the gaming device tracks the duration remaining in the flat rate play session and stops the play when the given period has elapsed. During the play, payouts are made either directly to the player in the form of coins or indirectly in the form of credits to the player's credit account.

30 Claims, 19 Drawing Sheets

227

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

U.S. PATENT DOCUMENTS

| | | | | |
|---|---|---|---|---|
| 4,593,904 | A * | 6/1986 | Graves | 463/9 |
| 4,669,731 | A | 6/1987 | Clarke | 273/143 R |
| 4,991,848 | A | 2/1991 | Greenwood et al. | 273/143 R |
| 5,178,390 | A | 1/1993 | Okada | 273/143 R |
| 5,267,734 | A * | 12/1993 | Stamper et al. | 463/23 |
| 5,287,269 | A | 2/1994 | Dorrough et al. | 364/408 |
| 5,569,082 | A * | 10/1996 | Kaye | 463/17 |
| 5,570,885 | A | 11/1996 | Ornstein | 463/27 |
| 5,613,912 | A | 3/1997 | Slater | 463/25 |
| 5,634,012 | A * | 5/1997 | Stefik et al. | 705/39 |
| 5,709,603 | A * | 1/1998 | Kaye | 463/17 |
| 5,768,382 | A | 6/1998 | Schneier et al. | 380/23 |
| 5,772,509 | A | 6/1998 | Weiss | 463/16 |
| 5,816,917 | A * | 10/1998 | Kelmer et al. | 463/16 |
| 5,830,067 | A | 11/1998 | Graves et al. | 463/40 |
| 5,833,538 | A | 11/1998 | Weiss | 463/21 |
| 5,970,143 | A | 10/1999 | Schneier et al. | 380/23 |
| 6,012,983 | A | 1/2000 | Walker et al. | 463/20 |
| 6,077,163 | A | 6/2000 | Walker et al. | 463/26 |
| 6,254,483 | B1 * | 7/2001 | Acres | 463/26 |
| 6,315,662 | B1 | 11/2001 | Jorasch et al. | 463/20 |
| 6,319,127 | B1 | 11/2001 | Walker et al. | 463/26 |
| 6,338,680 | B1 * | 1/2002 | Connors | 463/43 |
| 6,406,372 | B1 * | 6/2002 | Turmell et al. | 463/43 |
| 6,491,584 | B2 * | 12/2002 | Graham et al. | 463/25 |
| 6,527,638 | B1 | 3/2003 | Walker et al. | 463/25 |
| 6,709,331 | B2 | 3/2004 | Berman | 463/16 |
| 6,712,697 | B2 * | 3/2004 | Acres | 463/25 |
| 6,890,258 | B2 * | 5/2005 | Weiss | 463/25 |
| 6,896,616 | B2 * | 5/2005 | Weiss | 463/20 |
| 6,997,807 | B2 * | 2/2006 | Weiss | 463/25 |
| 7,217,190 | B2 * | 5/2007 | Weiss | 463/25 |
| 7,458,892 | B2 * | 12/2008 | Walker et al. | 463/25 |
| 7,476,153 | B2 * | 1/2009 | Walker et al. | 463/20 |
| 7,503,851 | B2 * | 3/2009 | Walker et al. | 463/26 |
| 7,524,244 | B2 * | 4/2009 | Walker et al. | 463/20 |
| 7,588,495 | B2 * | 9/2009 | Walker et al. | 463/16 |
| 7,591,726 | B2 | 9/2009 | Baerlocher et al. | |
| 7,607,981 | B2 * | 10/2009 | Walker et al. | 463/20 |
| 7,722,460 | B2 * | 5/2010 | Walker et al. | 463/25 |
| 7,753,792 | B2 * | 7/2010 | Walker et al. | 463/42 |
| 7,753,793 | B2 * | 7/2010 | Walker et al. | 463/42 |
| 2002/0143619 | A1 * | 10/2002 | Laurie | 705/14 |
| 2004/0162134 | A1 | 8/2004 | Walker et al. | |
| 2006/0040725 | A1 | 2/2006 | Walker et al. | |
| 2006/0079321 | A1 | 4/2006 | Walker et al. | |
| 2006/0217177 | A1 | 9/2006 | Walker et al. | |
| 2006/0232003 | A1 | 10/2006 | Walker et al. | |
| 2006/0248025 | A1 | 11/2006 | Walker et al. | |
| 2006/0252499 | A1 | 11/2006 | Walker et al. | |
| 2006/0252510 | A1 | 11/2006 | Walker et al. | |
| 2007/0249417 | A1 | 10/2007 | Walker et al. | |
| 2008/0318656 | A1 | 12/2008 | Walker et al. | |

OTHER PUBLICATIONS

Pledger, Marcia, “Going for the gold at slot tournaments”, Las Vegas Review-Journal, Dec. 24, 1995, p. 5.L.

Hawley, David, “Those one-armed bandits; Slot-machine tournaments lure throngs to Midwest casinos”, The Houston Chronicle, Apr. 9, 1996, Section: Houston, p. 3.

Grochowski, John, “Slot tourney prospers under Indiana rules”, Chicago Sun-Times, Apr. 6, 1997, Section: SHO, Casinos, p. 15, NC.

“Station Announces Formation of GameCast Live, LLC and Release of Remote Play eSlots for In-Room Gaming Applications”, PR Newswire, Jun. 6, 2001, Financial News Section.

Website, “Extending the Casino Floor”, GameCast Live, (http //www gamecastlivecom/presentation/toronto_files/slide0012 htm), download date: Jun. 6, 2001.

* cited by examiner

344

| PLAYER ID 410 | SOCIAL SECURITY NUMBER 412 | NAME 414 | ADDRESS 416 | PHONE NUMBER 418 | CREDIT CARD NUMBER 420 | CREDIT BALANCE 422 | (ACCUMULATED) COMP. POINTS 424 | HOTEL GUEST 426 | PLAYER RATING 428 | VALUE OF INTERVAL REMAINING 430 |
|---|---|---|---|---|---|---|---|---|---|---|
| 123456 | 123-45-7890 | BILL GREEN | 111 NORTH AVE. | (212) 555-1234 | 1111-2222-3333-4444 | $25.00 | 130 PTS. | NO | 4 | $30.00 |
| 876543 | 876-54-3210 | ROB BLUE | 423 SOUTH ST. | (812) 555-4321 | 2222-4444-6666-8888 | $17.50 | 240 PTS. | YES | 2 | $3.00 |
| 158595 | 555-12-6338 | KAREN RED | 64 WEST RD. | (315) 555-5954 | 1111-3333-5555-7777 | $0.00 | 350 PTS. | YES | 2 | $0.75 |

FIG. 4

246

| PLAYER ID NUMBER 510 | PLAYER SELECTED PRICE PARAMETERS 512 | FLAT RATE PRICE 514 | INTERVAL REMAINING 516 | TIME AUDIT DATA 518 | MACHINE ID NUMBER 520 |
|---|---|---|---|---|---|
| 123456 | TOP 3 JACKPOTS 90 MINUTES | $50.00 | 72 MINUTES | 6/21/97 10:30 AM | A846 |
| 876543 | ALL JACKPOTS 90 MINUTES | $200.00 | 3 MINUTES | 6/21/97 11:00 AM | B623 |
| 158595 | TOP JACKPOT 30 MINUTES | $30.00 | 15 MINUTES | 6/21/97 11:30 AM<br>6/21/97 11:45 AM | C103 |

FIG. 5

228

| PAY COMBINATION 610 | 1 COIN 620 | 2 COINS 630 | 3 COINS 640 | PAY COMBINATION STATUS 650 |
|---|---|---|---|---|
| DOUBLE JACKPOT | 400 | 800 | 1200 | ACTIVE |
| 5BAR-5BAR-5BAR | 50 | 100 | 150 | ACTIVE |
| SEVEN-SEVEN -SEVEN | 25 | 50 | 75 | INACTIVE |
| BAR-BAR-BAR | 20 | 40 | 60 | INACTIVE |
| CHERRY-CHERRY-CHERRY | 10 | 20 | 30 | INACTIVE |
| ANY PAIR-CHERRY | 5 | 10 | 15 | INACTIVE |
| ANY-ANY-CHERRY | 2 | 4 | 6 | INACTIVE |
| NON WINNING OUTCOMES | 0 | 0 | 0 | N/A |

FIG. 6

227

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

FIG. 7

229

| PACKAGE NUMBER 1410 | INTERVAL 1412 | DURATION OF FLAT RATE PLAY SESSION 1414 | AMOUNT WAGERED PER PLAY 1416 | PAY COMBINATION STATUS 1418 | FLAT RATE PLAY SESSION PRICE 1420 |
|---|---|---|---|---|---|
| 1 | HANDLE PULLS | 100 PULLS | 3 COINS | ALL ACTIVE | $30.00 |
| 2 | HANDLE PULLS | 100 PULLS | 3 COINS | TOP 3 ACTIVE | $20.00 |
| 3 | HANDLE PULLS | 250 PULLS | 3 COINS | ALL ACTIVE | $75.00 |
| 4 | HANDLE PULLS | 250 PULLS | 3 COINS | TOP 3 ACTIVE | $50.00 |
| 5 | TIME | 30 MINUTES | 3 COINS | ALL ACTIVE | $40.00 |
| 6 | TIME | 30 MINUTES | 3 COINS | DYNAMIC | $30.00 |
| 7 | TIME | 60 MINUTES | 3 COINS | ALL ACTIVE | $80.00 |
| 8 | TIME | 60 MINUTES | 3 COINS | DYNAMIC | $60.00 |
| 9 | TIME | 90 MINUTES | 3 COINS | ALL ACTIVE | $120.00 |

FIG. 14

METHODS AND APPARATUS FOR FACILITATING A FLAT RATE PLAY SESSION AND FOR EXTENDING SAME

CLAIM OF PRIORITY

The present application is a continuation-in-part application of commonly-owned, patent application Ser. No. 10/001,089 entitled GAMING DEVICE FOR A FLAT RATE PLAY SESSION AND A METHOD OF OPERATING SAME and filed Nov. 2, 2001 now U.S. Pat. No. 7,140,964; which is a continuation-in-part application of 09/518760, now U.S. Pat. No. 6,319,127 entitled GAMING DEVICE FOR A FLAT RATE PLAY SESSION AND A METHOD OF OPERATING SAME and filed Mar. 3, 2000; which is a continuation of 08/880838, now U.S. Pat. No. 6,077,163 entitled GAMING DEVICE FOR A FLAT RATE PLAY SESSION AND A METHOD OF OPERATING SAME and filed Jun. 23, 1997.

BACKGROUND OF THE INVENTION

1. Field of the Invention

The present invention relates generally to the structure and operation of at least one gaming device, such as a slot machine, wherein a flat rate price purchases a flat rate play session comprising multiple plays.

2. Description of Related Art

There are numerous types of gaming devices in use today. Most of these gaming devices, such as slot machines, video blackjack machines, video poker machines, and the like, require the player of the device to purchase individual plays at a set cost or wager per play. Because players can only purchase individual plays, they may stop playing after any individual play. Furthermore, having to purchase each individual play is inconvenient. Thus, a need exists for a gaming device allowing more convenient and efficient methods of play.

One scenario in which players seemingly purchase multiple plays on a gaming device during a flat rate play session is entry fee slot machine tournaments. Such tournaments typically involve players paying a fee for a set period of play determined by the casino. During such tournaments, each player plays a specific type and denomination of machine, also determined by the casino, and accumulates points rather than money. Those players accumulating the most points are awarded prizes.

Although slot machine tournaments are popular with some players, the tournaments are inflexible and not accommodating to individual player's preferences. The organizers set the time and duration of the tournament, the cost to play, the amount wagered per play, and the type of machines which are played. Furthermore, the organizers must designate machines for the tournament. Because these machines are available only to tournament players and not the general public, the machine owners lose revenue for all machines designated but not played during a tournament. Thus, a need still exists for a gaming device which allows tournament style play without comprising the revenue stream of a casino, particularly where the player selects the time and duration of the period, the amount wagered per play, and the particular gaming device played.

SUMMARY OF THE INVENTION

In accordance with one or more embodiments, a method provides for outputting an indication of at least one flat rate price package, each of the at least one flat rate price packages defining a respective at least one predetermined price parameter and thereby defining at least one flat rate play session. The method further provides for receiving a selection of one of the at least one flat rate price package, thereby determining a selected flat rate play session as well as for receiving a payment corresponding to a price of the selected flat rate play session, and for authorizing play of a gaming device in accordance with the selected flat rate play session. Various systems and apparatus for facilitating the above method are also disclosed.

In accordance with the present invention, there is provided a method, apparatus, and article of manufacture for providing a gaming session using a gaming device. In one embodiment, the method includes identifying at least one price parameter, determining a flat rate price based upon the at least one identified price parameter, and initiating a flat rate play session of the gaming device upon receiving an indication of payment of the flat rate price. The flat rate play session spans a pre-established duration.

In one embodiment, the price parameter is a player selected price parameter, such as the amount wagered per play, jackpot structure, length of the flat rate play session, the type of gaming device, time of day, day of the week, and day of the year. In another embodiment, the price parameter is an operator selected price parameter, such as player status rating, availability of gaming devices, and anticipated availability of gaming devices.

A gaming device is also disclosed. In one embodiment, the gaming device comprises a player interface and a processor coupled thereto. The player interface is capable of receiving player input, such as a player selected price parameter. The processor is configured to determine a flat rate price based on the player input for initiating and operating the gaming device during the flat rate play session.

A gaming system is also disclosed. In one embodiment, the gaming system includes multiple gaming devices, each having a player interface, a controller coupled to each of the gaming devices and a processor coupled to each of the player interfaces. The player interfaces receive at least one player selected price parameter and an indication of player selection of a flat rate play session lasting a pre-established duration upon receipt of a flat rate payment. The controller communicates with the gaming devices and includes a memory device in which player information is stored. The processor is configured to determine the flat rate price based on the player selected price parameter. The processor is also configured to initiate the flat rate play session upon receipt of the flat rate payment.

A method of playing a gaming device is also disclosed. The method includes the steps of selecting to play the gaming device in an optional timed mode of operation for a flat rate price. The method also includes the step of providing a player selected price parameter. The flat rate price is based on the player selected price parameter. The method further includes the steps of paying the flat rate price and initiating operation of the gaming device in the timed mode of play.

BRIEF DESCRIPTION OF THE DRAWINGS

FIG. 4 is a schematic view of a casino player database of the server of FIG. 3;

FIG. 5 is a schematic view of the flat rate database of the slot machine of FIG. 2;

FIG. 6 is a schematic view of the payout table of the slot machine of FIG. 2;

FIG. 7 is a schematic view of the calculation table of the slot machine of FIG. 2;

FIG. 14 is a schematic view of the flat rate price package database of the slot machine of FIG. 2.

DETAILED DESCRIPTION OF PREFERRED EMBODIMENTS

Certain preferred embodiments of the present invention will now be described in greater detail with reference to the drawings. Although the embodiments discussed herein are directed to reel slot machines, it should be understood that the present invention is equally applicable to other gaming devices, such as video poker machines, video blackjack machines, video roulette, video keno and the like.

The present invention is directed generally to a method and apparatus for operating a gaming device having a flat rate play session. As used herein, flat rate play session is defined as a period of play wherein the player need not make funds available for any play during the play session. The flat rate play session spans multiple plays of the gaming device. These multiple plays are aggregated into intervals or segments of play. It is to be understood that the term interval as used herein could be time, handle pulls, and any other segment in which slot machine play could be divided. For example, two hours, one hundred spins, fifty winning spins, etc. A player enters player identifying information and player selected price parameters at a gaming device. The price parameters define the flat rate play session, describing the duration of play, machine denomination, jackpots active, etc. The gaming device stores the player selected price parameters and proceeds to retrieve the flat rate price of playing the gaming device for the flat rate play session. The player selected price parameters, in combination with operator price parameters, determine the flat rate price. Should the player decide to pay the flat rate price, the player simply deposits that amount into the gaming device or makes a credit account available for the gaming device to debit. For example, it might cost twenty-five dollars to play for half an hour. Once the player initiates play, the gaming device tracks the flat rate play session and stops the play when the session is completed, usually when a time limit has expired. During the play session, the player is not required to deposit any coins. Payouts are made either directly to the player in the form of coins or indirectly in the form of credits to the credit balance stored in the machine. It should be understood that the player balance could be stored in a number of mediums, such as smart cards, credit card accounts, debit cards, and hotel credit accounts. For example, a player balance may be stored on a server device, such as a slot network server.

Figure 1:
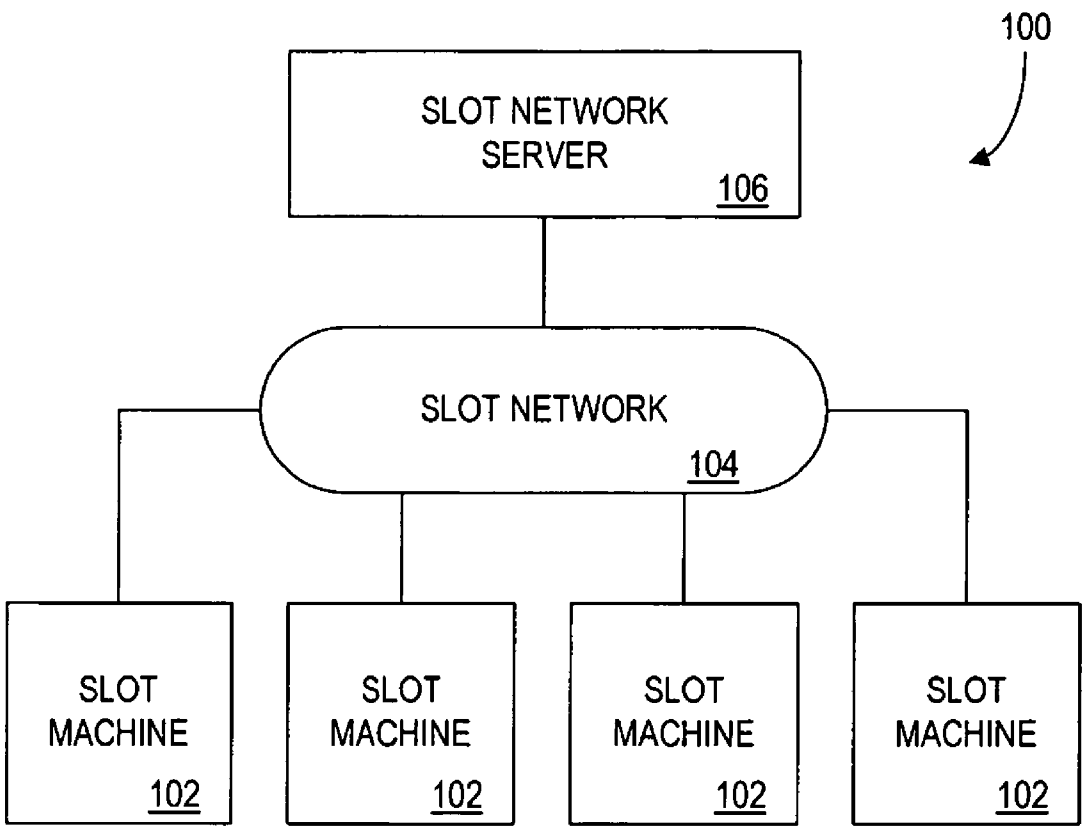
FIG. 1 is an overall schematic view of a system according to one embodiment of the present invention, including a slot machine and a slot network server.

With reference to FIG. 1, a system 100 according to one embodiment of the present invention is shown. In general, the system 100 comprises multiple slot machines 102 and a slot network server 106. In the present embodiment, each slot machine 102, which is uniquely identified by a machine identification (ID) number, communicates with the slot network server 106 via a slot network 104. The slot network 104 is preferably a conventional local area network controlled by the server 106. It is to be understood, however, that other arrangements in which the slot machines 102 communicate with the server 106 are within the scope of the present invention.

As will be described in greater detail below, in one embodiment, the slot machine 102 communicates player identifying information to the slot network server 106. The slot network server 106, in turn, verifies the player identifying information. The slot machine 102 also calculates a flat rate price based on both player selected and casino determined price parameters and displays the flat rate price to the player. The player may then accept the flat rate price and initiate play. In another embodiment, the present invention may be practiced without server 106, in an arrangement in which the slot machine 102 calculates the flat rate price.

Figure 2A:
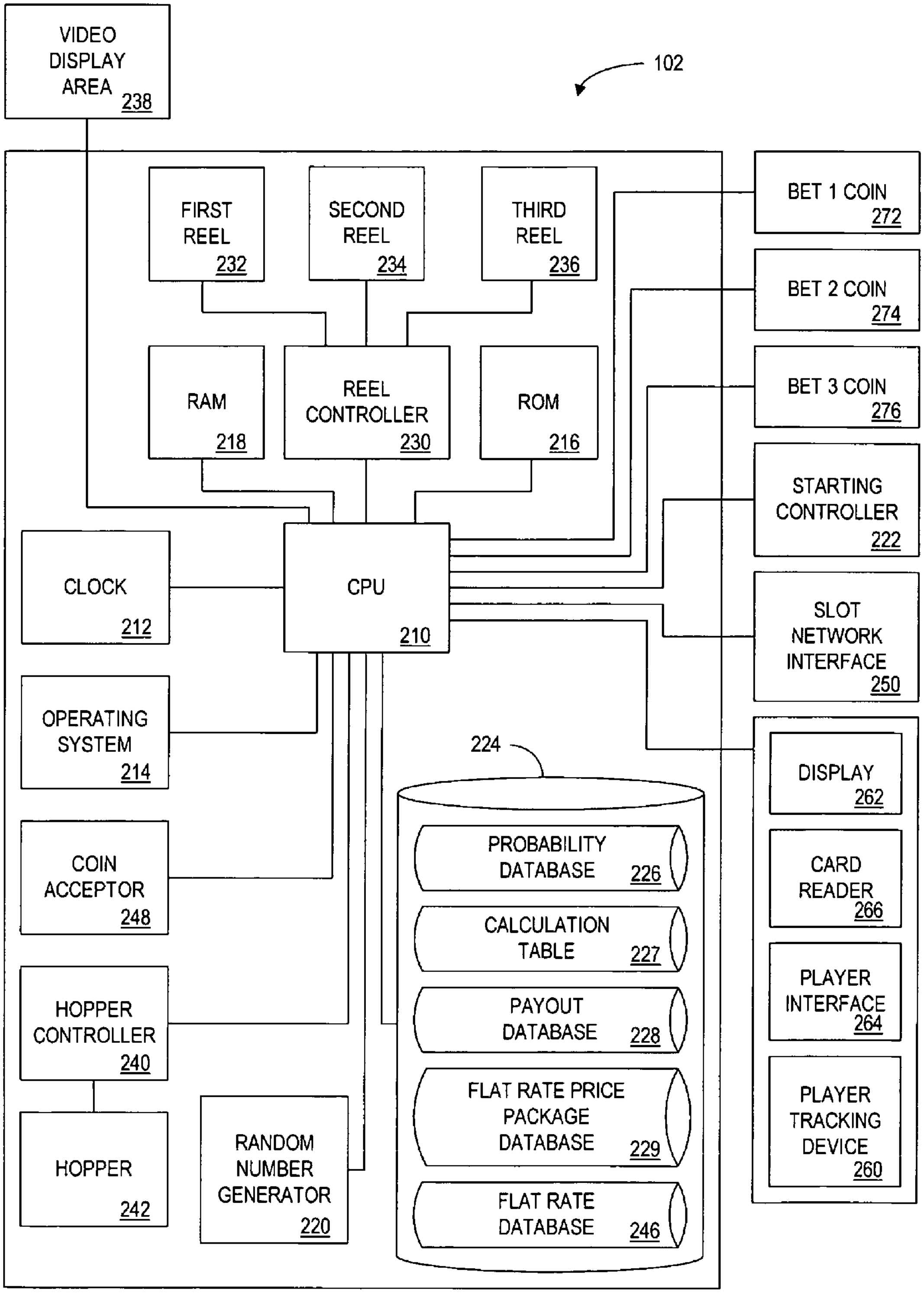
FIG. 2*a* is a schematic view of the slot machine of FIG. 1.

With reference to FIG. 2*a*, the slot machine 102 will now be described in greater detail. The slot machine 102 contains a Central Processing Unit (CPU) 210, a clock 212, and an operating system 214 (typically stored in memory as software). The CPU 210 executes instructions of a program stored in Read Only Memory (ROM) 216 for playing the slot machine 102. The Random Access Memory (RAM) 218 temporarily stores information passed to it by the CPU 210 during play. Also in communication with the CPU 210 is a Random Number Generator (RNG) 220.

With respect to gaming operations, the slot machine 102 operates in a conventional manner. The player starts the machine 102 by inserting a coin into coin acceptor 248, or using electronic credit, and pressing the starting controller 222. Of course, as would be understood by one of ordinary skill in the art upon reading the present disclosure, the coin acceptor 248 may, in some embodiments, also include a bill acceptor for accepting bills or another type of currency. Under control of a program stored, for example in a data storage device 224 or ROM 216, the CPU 210 initiates the RNG 220 to generate a number. The CPU 210 looks up the generated random number in a stored probability table 226, which contains a list which matches random numbers to corresponding outcomes, and finds the appropriate outcome. Based on the identified outcome, the CPU 210 locates the appropriate payout in a stored payout table 228. The CPU 210 also directs a reel controller 230 to spin reels 232, 234, 236 and to stop them at a point when they display a combination of symbols corresponding to the appropriate payout. When the player wins, the machine stores the credits in RAM 218 and displays the current balance in video display area 238. In an alternate embodiment, the slot machine 102 dispenses the coins to a payout tray (not shown), and in another embodiment, the slot network server 106 stores the player credits.

A hopper controller 240 is connected to a hopper 242 for dispensing coins. When the player requests to cash out by pushing a cashout button (not shown) on the slot machine 102, the CPU 210 checks the RAM 218 to see if the player has any credit and, if so, signals the hopper controller 240 to release an appropriate number of coins into a payout tray (not shown). A coin acceptor 248 is also coupled to the CPU 210. Each coin received by the coin acceptor 248 is registered by the CPU 210.

In alternate embodiments, the slot machine 102 does not include the reel controller 230 and reels 232, 234 and 236. Instead, a video display area 238 graphically displays representations of objects contained in the selected game, such as graphical reels, playing cards or, as described below, options which a player may select pursuant to the purchase of a flat rate play session (e.g., player-selected price parameters, pre-established flat rate packages as designed by the casino). Thus, in some embodiments, video display area 238 may comprise a touch-sensitive display screen, as is known in the art, such that video display area 238 may operate to output representations of objects, as well as receive input from a player (e.g., indicating a selection of an object represented by the display). In some embodiments, representations may be animated to display playing of the selected game.

Also in communication with the CPU 210 is a player tracking device 260. The tracking device 260 comprises a card reader 266 for reading player identifying information stored on a player tracking card. As used herein, the term player identifying information denotes any information or compilation of information that uniquely identifies a player. In the present embodiment, the identifying information is a player identification (ID) number. Although not so limited, the player tracking card of the present embodiment stores the player ID on a magnetic strip located thereon. Such a magnetic strip and device to read the information stored on the magnetic strip are well known. Again, a player tracking card is not limited to a card that stores the player ID on a magnetic strip. For example in some embodiments, a player tracking card may comprise a smart card equipped with a memory for storing such data. In other embodiments, players may identify themselves to system 100 in a variety of other manners, such as by entering one or more PIN codes via a slot machine, providing a paper ticket which encodes a player identifier, providing a biometric for measurement, and so on.

The player tracking device 260 also includes a display 262 and a player interface 264. The player interface 264 may include a keypad and/or a touchscreen display. In operation, as discussed below, the slot machine 102 displays a message prompting the player to enter player selected price parameters. In the present embodiment, a player may enter the player selected price parameters via the player interface 264. Because the player interface 264 is part of the tracking device 260, it is, therefore, in communication with the CPU 210. Alternatively, input of selected price parameters may be accomplished through video display area 238 if it is configured with touch screen capabilities.

The slot machine 102 also includes a series of bet buttons 272, 274, 276. The bet buttons include “Bet 1 coin” 272, “Bet 2 coins” 274, and “Bet 3 coins” 276. The bet buttons 272, 274, 276 are coupled to the CPU 210. Therefore, pressing one transmits a signal to the CPU 210 indicating how much a player is wagering on a given play. As would be understood upon a reading of the present description, it should be appreciated that video display area 238 may output player-selectable representations of such buttons.

The databases stored in the data storage device 224 include a probability table 226, a calculation table 227, a payout table 228, a flat rate price package database 229, and a flat rate database 246. As discussed in greater detail below, the flat rate database 246 and the calculation table 227 store information related to the flat rate play session and calculation of the flat rate price, respectively. The flat rate price package database 229 stores information describing different pre-established flat rate packages as custom designed by the casino.

Also connected to the CPU 210 is a slot network interface 250. The slot network interface 250 provides a communication path from the slot machine 102 to slot network server 106 through the slot network 104. Thus, as discussed in greater detail below, information is communicated among the player tracking card, player tracking device 260, slot machine 102, and slot network server 106.

Figure 2B:
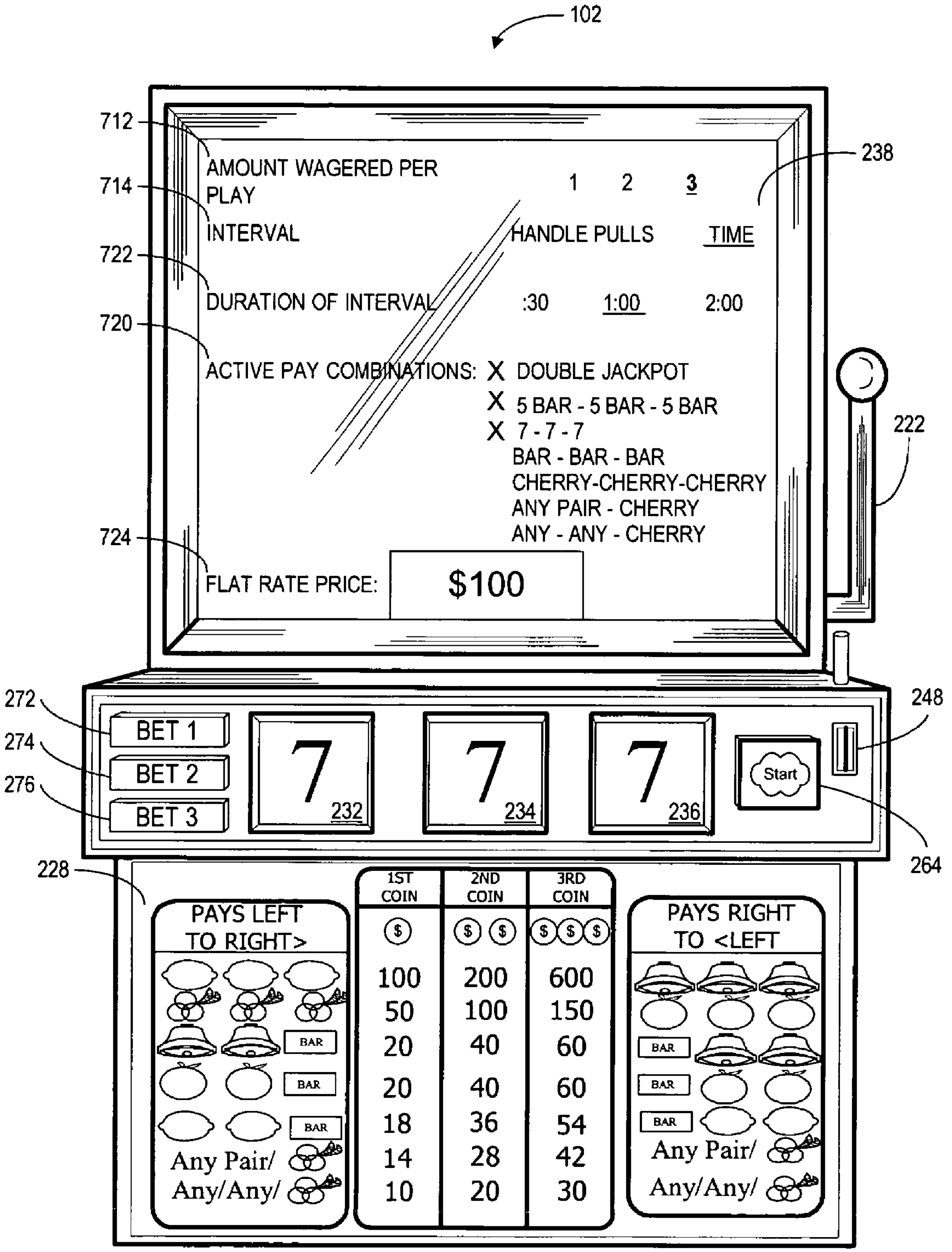
FIG. 2*b* is a plan view of the slot machine of FIG. 1.

With reference to FIG. 2*b*, the plan view of slot machine 102, will now be described below. FIG. 2*b* depicts slot machine 102 displaying player selected price parameter options on video display area 238. Included in the displayed parameters is amount wagered per play 712, interval 714, duration of interval 722, and active pay combinations 720. As will be described further below, after the player has selected the desired price parameters, the slot machine 102 displays a flat rate price 724. Once the player has accepted the flat rate price and made the appropriate funds available, play may commence.

Figure 3:
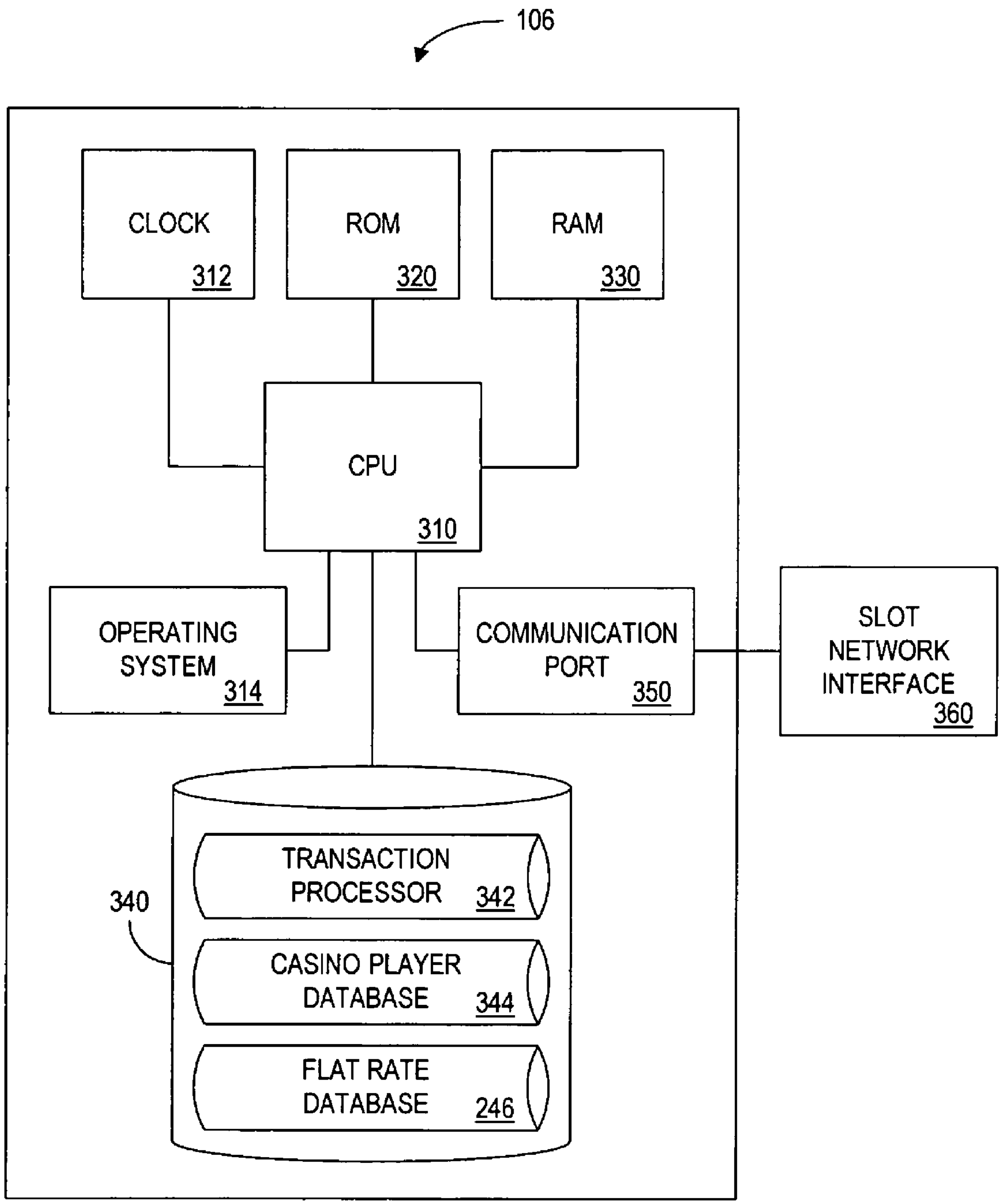
FIG. 3 is a schematic view of the slot network server of FIG. 1.

The slot network server 106 will now be described in greater detail with reference to FIG. 3. Like the slot machine 102 of FIG. 2, the slot network server 106 has a Central Processing Unit (CPU) 310. The CPU 310, which has a clock 312 associated therewith, executes instructions of a program stored in Read Only Memory (ROM) 320. During execution of the program instructions, the CPU 310 temporarily stores information in the Random Access Memory (RAM) 330.

Additionally, the CPU 310 is coupled to a data storage device 340, having a flat rate database 246, transaction processor 342 and a casino player database 344. In general, the transaction processor 342 manages the contents of the data storage devices 340. As discussed in detail below, the casino player database 344 stores information specific to each player, including player identifying information.

Of course, as would be understood by one of ordinary skill in the art of computer programming upon reading the present description, different and/or additional databases, database structures, database configurations and/or data may be used to implement embodiments described herein, different from that explicitly described herein.

In order to communicate with the slot machines 102, the slot network server 106 also includes a communication port 350. The communication port 350 is coupled to the CPU 310 and a slot machine interface 360. Thus, the CPU 310 can control the communication port 350 to receive information from the data storage device 340 and RAM 330 and transmit the information to the slot machines 102 and vice versa, It is to be understood that because the slot machines 102 are in communication with the slot network server 106, information stored in a slot machine 102 may be stored in the server 106 and vice versa. Thus, for example, in an alternate embodiment, the server 106 rather than the slot machine 102 includes the payout table 228, flat rate database 246, and/or calculation table 227.

The casino player database 344 of the present embodiment, as shown in FIG. 4, includes multiple records having multiple fields of information. Specifically, the casino player database 344 comprises multiple records, each record being associated with a particular player, as identified by a player identification (ID) number. The fields within each record include: player identification (ID) number 410, social security number 412, name 414, address 416, telephone number 418, credit card number 420, credit balance 422, complimentary information, such as total accumulated complimentary points 424, whether the player is a hotel guest 426, player status rating 428, and value of interval remaining 430. Having information related to one field, such as player ID 410, allows the slot network server 106 to retrieve all information stored in corresponding fields of that player record.

It is to be understood that not all of these identifying fields are necessary for operation of the present embodiment. For example, the name 414, social security number 412, address 416, telephone number 418, credit card number 420, and hotel guest 426 fields are merely representative of additional information that may be stored and used for other purposes. In one embodiment, credit card number 420 and hotel guest 426 are used for billing purposes and social security number 412 is used to generate tax forms when a player wins a jackpot over a given amount.

Complimentary points awarded 424 is further illustrative of additional information a casino may store in a player's record. As described below, a player's complimentary points are displayed to the player when a player tracking card is inserted into the slot machine 102. In an alternate embodiment, such points may be used in addition, or as an alternative to the credit balance 422 stored in RAM 218 of slot machine 102.

The player status rating 428 contains information representative of the particular player's relative importance to the casino, as based upon the frequency and duration of the player's visits, the amount of money wagered, and the like.

The value of interval remaining field 430 stores the value of interval remaining in a flat rate play session when a player terminates the play session prior to its expiration. This field will be described in greater detail below.

The flat rate database 246 will now be described in greater detail with reference to FIG. 5. The flat rate database 246 comprises multiple records, each record pertaining to the flat rate play session of a particular player, as identified by that player's ID number. Consequently, one field in flat rate database 246 is the player ID number field 510. Other fields include: player selected price parameters 512, flat rate price 514, interval remaining 516, time audit data 518, and machine identification (ID) number field 520. The machine ID number field 520 contains the machine ID number that uniquely identifies the slot machine 102. It is to be understood that since both the casino player database 244 and the flat rate database 246 include a player ID field, 410 and 510, respectively, the system 100 can correlate any player information stored in the flat rate database 246.

The payout table 228 will now be described in greater detail with reference to FIG. 6. As shown in FIG. 6, the payout table 228 of the present embodiment can be logically represented by five fields of related information. The first field, a pay combination field 610, identifies the set of possible pay combinations for a given slot machine 102. Such possible pay combinations include winning pay combinations, or those in which a payout results, and non-winning pay combinations, in which the player receives no payout and consequently loses the amount wagered. Winning pay combinations include, for example, "DOUBLE JACKPOT-DOUBLE JACKPOT-DOUBLE JACKPOT" and "BAR-BAR-BAR." The pay combinations field 610 also includes a "NON-WINNING OUTCOMES" record, an entry representing the outcomes which result in no payout to the player, such as "PLUM-BELL-ORANGE." The payout table 228 also includes three payout fields 620, 630, 640. Such payout fields 620, 630, 640 contain the payout information for each of the possible pay combinations identified in the pay combinations field 610. Each of the payout fields 620, 630, 640 is identified by the number of coins wagered on a particular play, as selected via the bet buttons 272, 274, 276. It should be understood based on a reading of the present disclosure that, in some embodiments, a number of coins wagered per play may be selected only once (e.g., at the beginning of a flat rate play session) such the wager may be placed automatically without requiring repeated selection from a player. This should be understood since, as described herein, in some embodiments a player establishing a flat rate play session defines the amount to be wagered per play. Further, in some embodiments, a number of coins wagered per play (and a denomination of coins) may comprise a player-selected price parameter and/or casino-selected price parameter, as is described below. In the present embodiment, payout table 228 contains a "1 coin" payout field 620, which is accessed when one coin is wagered, a "2 coins" payout field 630, which is accessed when two coins are wagered, and a "3 coins" payout field 640, which is accessed when three coins are wagered. In other words, each field 620, 630, 640 corresponds to a bet button 272, 274, 276, respectively. The payout information provides the number of coins won upon the occurrence of a particular pay combination. Thus, "CHERRY-CHERRY-CHERRY" pays out ten coins when one coin is wagered.

Finally, the payout table 228 of the present embodiment includes a pay combination status field 650. The pay combination status field 650 includes an indication for each winning pay combination, identified in the pay combination field 610, of whether the player is eligible to win the payout for each outcome. As will be described below, the determination of whether a player is eligible to win a payout for a given outcome is made, in some embodiments, by the player as part of the player selected price parameters.

The calculation table 227 will now be described in greater detail with reference to FIG. 7. The calculation table 227 is used by the system 100 in determining the flat rate price 724 (field 514 in the flat rate database 246) charged to the player. Specifically, the calculation table 227 contains multiple price parameters which are correlated to a flat rate price 724. More specifically, these price parameters include player selected price parameters and operator selected price parameters. In general, player selected price parameters include any game related variable that defines the flat rate play session. Furthermore, operator selected price parameters are parameters which the operator of the slot machines 102 selects as affecting the flat rate price 724. Thus, in the present embodiment, the player selected price parameters in the calculation table 227 include machine type 710, amount wagered per play 712, active pay combinations 720, and length of the flat rate play session 722. The operator selected price parameters in the calculation table 227 include player status rating 714, time of day 716, day of the week 718, and machine usage 719. Of course, as would be understood at least because of the usage of the term "include" in the immediately prior sentence, other price parameters may be considered. For example, additional examples of a price parameter (whether player or operator selected) include, but are not limited to, the following (i) the standard deviation of payouts associated with a slot machine (e.g., larger standard deviations may put upward pressure on package pricing), (ii) whether or not a slot machine offers one or more "progressive" jackpots, and so on. In the present embodiment the flat rate price 724 is predetermined based upon the aforementioned price parameters and stored in the calculation table 227, as will be described later in FIGS. 14 and 15. In an alternate embodiment the flat rate price 724 is calculated based upon these parameters as needed according to a price algorithm stored in memory. For example, the price algorithm may operate as follows:

Algorithm for calculating a flat rate price.

The first step is to determine a "base" flat rate price. This would be calculated as follows:

Price=(amount wagered).times.(interval).times.(expected coins awarded for all active pay combinations/amount wagered per play.times.cycle). For example, the following base calculation represents a player selecting three dollar coins per handle pull, an interval of 500 handle pulls, top three pay combinations active:

Base Price=($3).times.(500).times.(2,160/10,648) =$304.28

Further, this base flat rate price is adjusted by operator price parameters such as the following:

1. Time of Day (TD)

Times of the day in which the casino traffic tends to be heavy should result in the player paying a premium for the flat rate session, while quiet times in the casino should offer the player a discount over normal rates.

| | |
|---|---|
| Midnight to 4 am | 70% |
| 4 am to 8 am | 80% |
| 8 am to 12 pm | 90% |
| 12 pm to 4 pm | 100% |
| 4 pm to 8 pm | 120% |
| 8 pm to Midnight | 140% |

2. Day of Week (DW)

With the heaviest volume of visitors falling on Fridays and Saturdays, these days will necessitate higher flat rate session costs. For example:

| | |
|---|---|
| Monday to Thursday | 80% |
| Friday | 120% |
| Saturday | 140% |
| Sunday | 100% |

3. Player Status Rating (PSR)

For top customers such as high rollers, the cost of a flat rate session may be reduced as a customer retention tool. For example:

| | | |
|---|---|---|
| 1 | (High Roller) | 80% |
| 2 | (Good customer) | 90% |
| 3 | (Average) | 100% |
| 4 | (Low) | 120% |

4. Slot Machine Usage (SMU)

When the majority of slot machines in the casino are being used, a premium is applied to the cost of the flat rate play session in order to more evenly distribute play. For example:

| | |
|---|---|
| Heavy | 120% |
| Moderate | 100% |
| Light | 80% |

Sample Calculation

In addition to the above player selected price parameters, the following operator selected parameters are incorporated into the price: The player is in the casino at 2 am on a Wednesday, there is low slot machine usage, and the player has an average rating. The calculations below reflect these conditions.

The casino may round up this price to $137 to avoid the need for small change.

As will be understood by those skilled in the art, the ultimate goal of slot machine players is to hit a jackpot payout. The enjoyment of the play, as well as the ability to maximize the chance of hitting a large jackpot, is increased by more play. Play can be increased both by playing longer, and by playing faster. As will be appreciated from a consideration of the process described below, the present invention permits both increased duration, by providing for play at discounted prices, and speed of play, by providing for minimal time delays between plays.

The flat rate price package database 229 will now be described in greater detail with reference to FIG. 14. The flat rate price package database 229 is used by the system 100 in providing the player with different price package options for flat rate play of the slot machine 100. Specifically, the flat rate price package database 229 contains multiple combinations, or packages 1410, of price parameters which correspond to pre-established flat rate prices. More specifically, these price parameters include but are not limited to, interval 1412, duration of flat rate play 1414, amount wagered per play 1416, and pay combination status 1418. Each combination of price parameters has corresponding flat rate play session prices 1420. As will be described later in FIG. 15, the flat rate price package database 229 is accessed when the player determines he wishes to initiate a flat rate play session. Rather than let the player choose the price parameters, the slot machine 100 lists the different packages stored in the flat rate price package database 229. The player then chooses the package he likes the most and play commences.

Having thus described the components of the present embodiment, the operation of the system 100 will now be described in greater detail with reference to FIGS. 8-11, and continuing reference to FIGS. 1-7. It is to be understood that the programs stored in ROM 320 of the slot network server 106 and ROM 216 of the slot machine 102 provide the function described below.

Figure 8A:
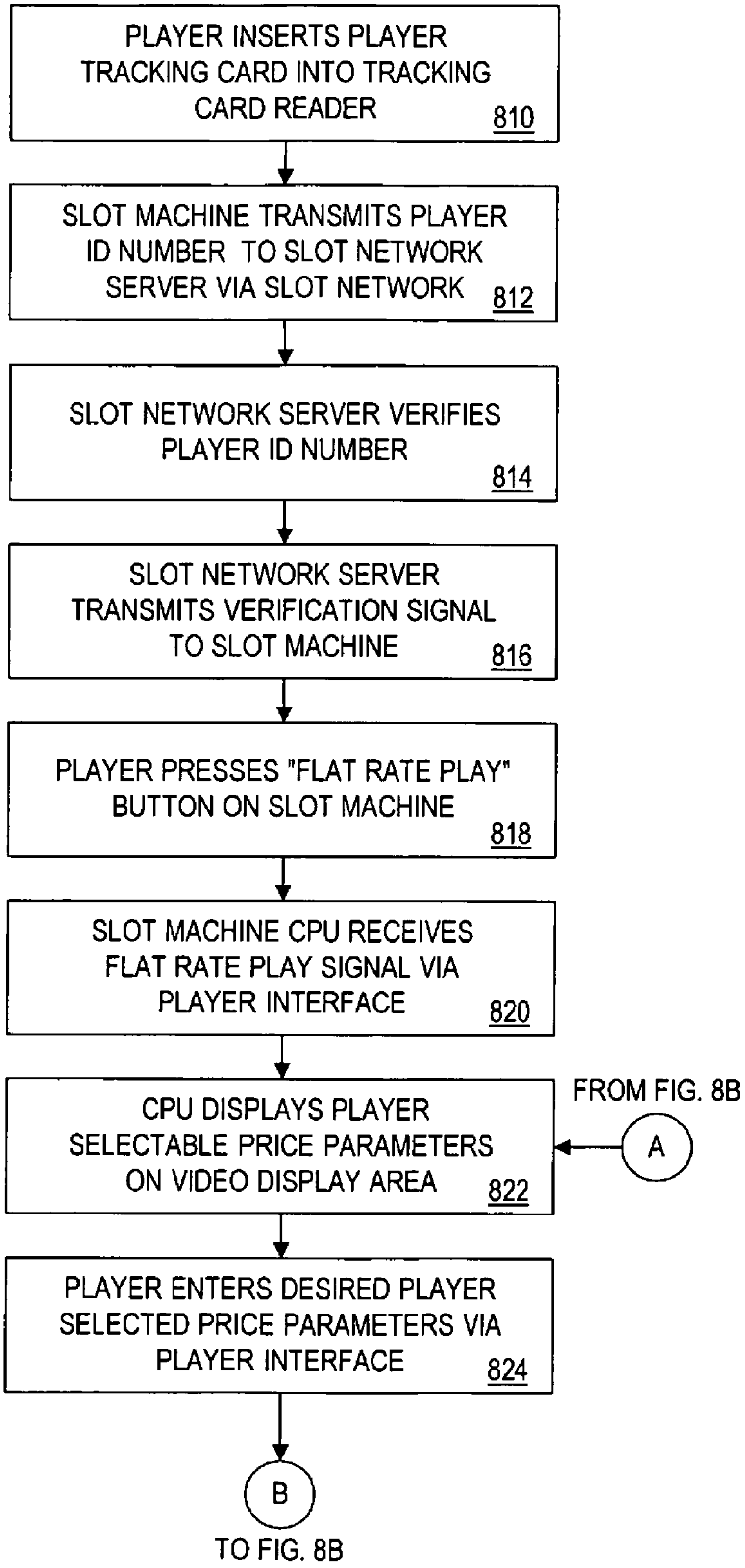
FIGS. 8*a* and 8*b* are overall flow diagrams of the operation of the system of FIG. 1.
Figure 8B:
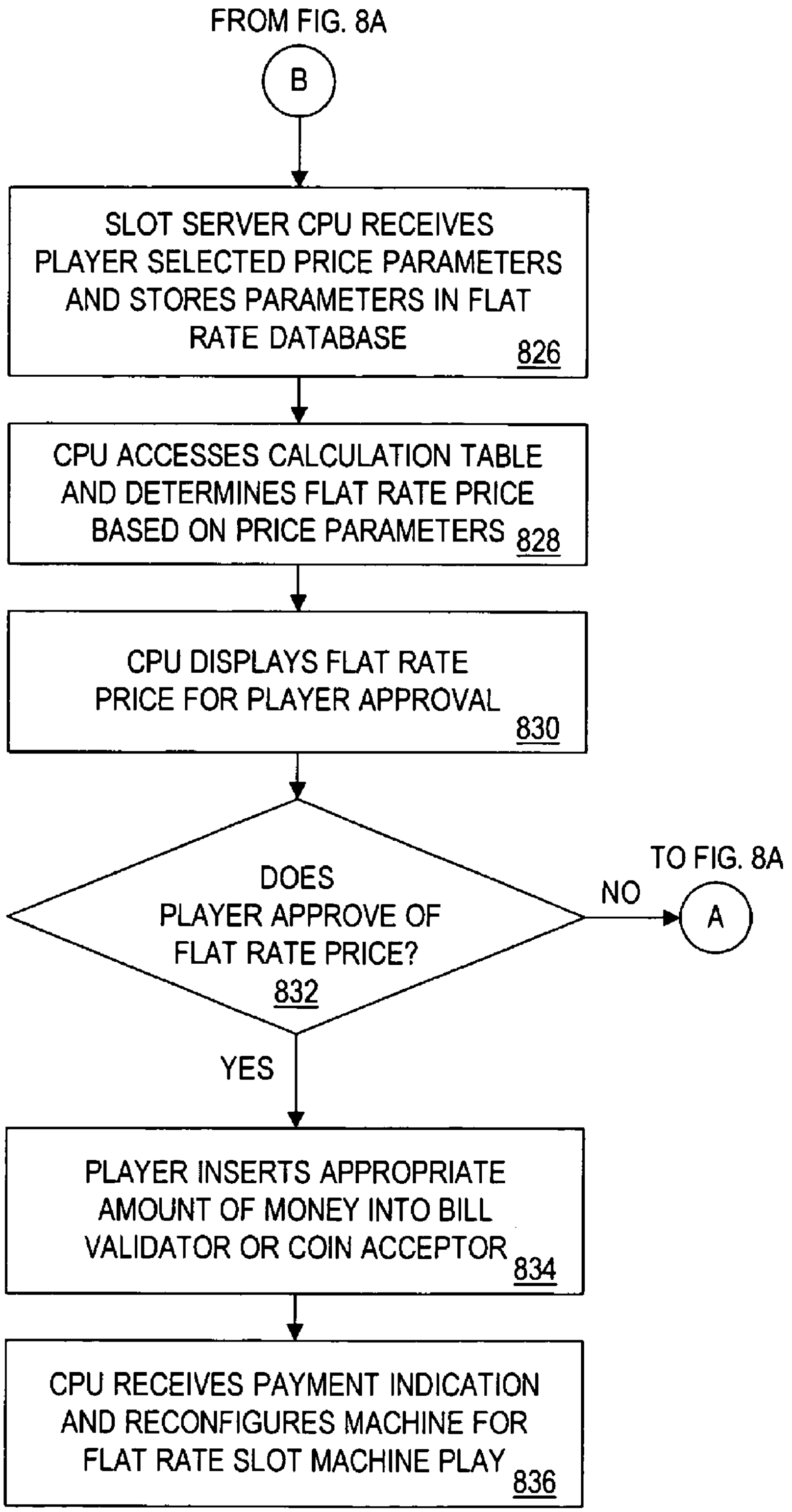

Turning first to FIGS. 8*a* and 8*b*, the general operation of the system 100 will be described. As shown in step 810, the slot machine player first inserts the player tracking card into the card reader 266. The card reader 266 then proceeds to read player identifying information from the tracking card. The player identifying information, namely the player ID number, is communicated from the slot machine 102 to the slot server 106 in step 812.

Upon receiving the player identifying information, the slot network server 106 verifies the information in step 814. Such verification includes the slot network server 106 searching the casino player database 344 for a record containing the received player ID number in the appropriate field 410. Once the slot network server 106 verifies the player identifying information, the server 106 transmits a signal to the slot machine 102 acknowledging such verification in step 816. In alternate embodiments, other information, such as the player's name 414, complimentary point total 424, and player status rating 428 are transmitted to the slot machine 102 for display.

In step 818, the player selects flat rate play via the player interface 264. The CPU 210 of slot machine 102, in step 820, then receives a signal from the player interface 264, indicating that the player has selected flat rate play. For example, there could be a button specifically for triggering a flat rate play session. The CPU 210, in response, accesses memory to retrieve player selectable price parameters. Player selectable price parameters are the choices available to a player for entering the player selected price parameters. These player selectable price parameters are controlled by a program stored in ROM 216. Such player selectable price parameters, in the present embodiment, include the amount wagered per play, (e.g. one, two, or three coins), the length of the flat rate play session, and possible jackpot structures, such as having only the "DOUBLE JACKPOT" and "5 BAR" jackpots active (as illustrated in the payout table 228 of FIG. 6). In an alternate embodiment, the player selectable price parameters are stored as part of the calculation table 227.

Then, as shown in step 822, the slot machine 102 displays the player selectable price parameters to the player. For example, the parameters could be listed on the video display area 238 for the player, as described previously in FIG. 2*b*. Once the parameters appear, the player simply selects his desired settings. Alternatively, the player may accept one or more default settings. Once the player selectable price parameters are displayed on the display 238, the player proceeds, in step 824, to enter player selected price parameters via the player interface 264. The player selected price parameters also include data which, although not directly inputted by the player, is selected by the player and identified by the slot machine 102. In the present embodiment, such additional player selected price parameters include type of machine, time of day, and day of the week.

It is to be understood that the casino operator of the slot machines 102 may define the scope of the player selectable price parameters, and therefore limit the player selected price parameters in any manner. For example, the length of flat rate play may be limited to periods above a minimum time or to periods that are multiples of thirty minute intervals. The jackpot structure may require that some jackpots remain active.

Referring now to FIG. 8*b*, the slot machine 102 CPU 210 receives the player selected price parameters in step 826. Having received the player selected parameters, the CPU 210 then stores the player selected price parameters, the player identifying information, and the slot machine's machine ID number in a record in the flat rate database 246. Specifically, the player ID number is stored in field 510, the machine ID number is stored in field 520, and the player selected price parameters are stored in field 512. Although the player selected price parameters are illustrated as being stored in a single field (512), it is to be understood that each player selected price parameter may be stored in a separate field. It is also to be understood that in alternate embodiments the player selected price parameters need not be stored in a database, but could be stored in RAM 218.

The slot machine 102 CPU 210 uses the player selected price parameters to determine the flat rate prices. Specifically, in step 828, the CPU 210 accesses the calculation table 227 and searches for the flat rate price 724 corresponding to the received player selected price parameters 512, which, in the present embodiment, include machine type 710, amount wagered per play 712, time of day 716, day of the week 718, active jackpots 720, and the length of the flat rate play session 722. The CPU 210 also incorporates operator selected price parameters for the flat rate price 724 such as player status rating 714 and machine availability 719. As will be appreciated by one skilled in the art, the player status rating 714 is received from the casino player database 344 at any time prior to determination of the flat rate price 724. Thus, in a preferred embodiment, the slot network server 106 transmits the player status rating 428 to the slot machine 102 along with the verification signal in step 816.

By including the player status rating 714 in the calculation table 277, a casino may reward frequent players who wager relatively large amounts of money with a lower flat rate price 724. Thus, the system 100 rewards and encourages frequent play. By including active jackpots 720 in the calculation table 348, the system 100 allows a casino to discount the flat rate price 724 for those players who choose to enable relatively few winning outcome in the payout table 228. Furthermore, by including the price parameters relating to time of day and day of the week in the calculation table 227, a casino may charge a lower flat rate price 724 for sessions during weekday afternoons or between 2:00 a.m. and 8:00 a.m. in the mornings, thereby encouraging play of the slot machines 102 when they are typically idle.

It is to be understood that the aforementioned price parameters in the calculation table 227 are merely representative of the type of variables that may be considered in determining a flat rate price. Thus, it is within the scope of the present invention to include only some of the price parameters, all of the parameters, or additional parameters in the calculation table 227.

As mentioned above, the flat rate price may be based partly upon the availability of slot machines 102. In such an embodiment, the server 106 tracks whether each slot machine 102 is being used by noting whether outcomes are currently being received from a given slot machine 102. In another embodiment, the server 106 tracks slot machine availability by tabulating the number of slot machines 102 for which flat rate play is currently enabled. In yet another embodiment, the server 106 tracks slot machine availability by identifying how many slot machines 102 have a player tracking card inserted therein.

Another price parameter which may be used is predicted or forecasted slot machine availability. Specifically, such a parameter accounts for anticipated availability of slot machines 102 based upon events at the casino. For example, the calculation table 227 correlates a lower flat rate price 724 to the time of day 716 corresponding to an event, such as a show which many casino players attend. On the other hand, the calculation table 227 correlates a higher flat rate price to the time of day 716 corresponding to the end of the event or heavier casino traffic. This enables a casino to effectively revenue manage their slot machines without resorting to a change in hold percentage which requires regulatory approval.

It is to be understood that accounting for slot machine availability need not be accomplished in the calculation table 227. Rather, in an alternate embodiment, a schedule of events is stored in RAM 218 which is accessed prior to transmitting the flat rate price 724 to the player. If the event schedule indicates that an event is ending during the requested flat rate play session, then the flat rate price 724 will be incremented accordingly.

In another embodiment, the flat rate price is based only on operator selected price parameters. A slot machine 102 according to such an embodiment could, for example, provide discounted flat rate play sessions based on player status rating, thereby offering 100 plays for the price of 90 or discounted timed sessions. To encourage repeat, high stakes play, higher player status ratings result in greater discounts.

Having determined the flat rate price 724, the slot machine 102, in step 830, displays the duration of the flat rate play session 722 and the flat rate price 724 and requests approval from the player. Once the player accepts the terms of the flat rate play session, flat rate play commences.

If the player does not approve the flat rate price 724, then the player indicates so via the player interface 264. As indicated by path A in FIGS. 8*a* and 8*b*, the slot machine 102 repeats its operation from step 822. On the other hand, if the player approves the flat rate price 724, the player indicates such approval via the player interface 264 in step 832. Following such approval, the slot machine 102 prompts the player to enter an appropriate amount of money in step 834. In the present embodiment, the player deposits coins into the coin acceptor 248 or, as would be understood by one of ordinary skill in the art of payment acceptors in gaming devices, a bill acceptor that may also be a component of the slot machine 102. In one embodiment, the player deposits a casino token as payment for the flat rate session. Such tokens may be denominated in dollars, or represent a number of handle pulls. A casino could thus sell a fifty handle pull token, usable on a particular denomination and/or type of machine. Such a token may additionally serve to activate the flat rate session, eliminating the need for the player to select flat rate play via player interface 264. Alternatively, the player's credit balance 422 may be debited to pay for the flat rate play session. Other methods of payment, such as tickets, vouchers, electronic currency, and so on, would be understood as equivalents to those described by one of ordinary skill in the art of payment accepting mechanisms for gaming devices.

Once the CPU 210 registers the receipt of money, the CPU 210 reconfigures the slot machine 201 for the flat rate play session in step 836. Specifically, the CPU 210 generates a signal, or a flag in memory, indicating that there is no need to accept the coins between plays. CPU 210 further sets the active field 650 in the payout table 228 according to the jackpot structure entered by the player.

Figure 9:
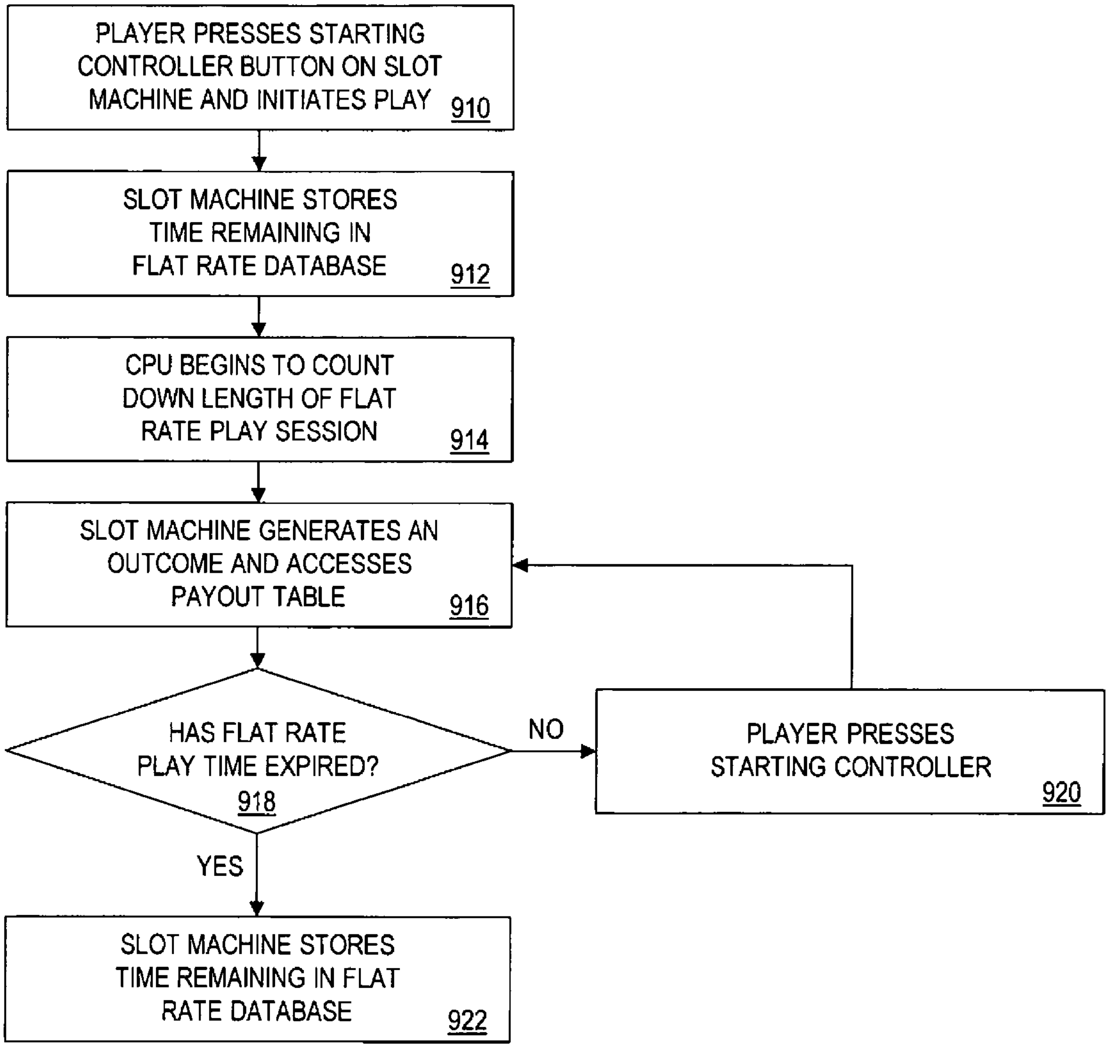
FIG. 9 is a detailed flow diagram of the operation of the system of FIG. 1.

The operation of the slot machine 102 during the flat rate play session will now be described with reference to FIG. 9 and continuing reference to FIGS. 1-7. During the flat rate play session, a slot machine 102 operates generally as described above with reference to FIG. 2. However, the slot machine 102 is reconfigured to operate according to the player selected price parameters, if such parameters affect play, and to operate continuously, without requiring payment between each play (e.g., a wager amount may or may not be deducted from a credit balance in association with each play). Specifically, the flat rate play session begins when the player presses the starting controller 222 in step 910. The CPU 210 also initiates a countdown of the length of the flat rate play session as stored in the player selected parameters field 512 of the flat rate database 246. With the start of the session, the CPU 210 stores the start time of the flat rate play session in the flat rate database 246. Specifically, the start time is stored in the time audit data field 520 in step 912. In step 914, the CPU 210 begins to count down the duration of the flat rate play session. Next, in step 916, the slot machine 102 generates an outcome and accesses payout table 228 to determine the appropriate corresponding number of coins to be paid out.

Furthermore, in step 918, after each outcome is generated, the slot machine 102 determines whether the countdown of the interval remaining 516 has reached zero. It is to be understood that the countdown may be implemented in either software or hardware. Additionally, it is understood that the countdown process discussed herein may be replaced with any suitable means for tracking the duration of the flat rate play session. Interval remaining 516 may also represent the number of handle pulls remaining.

In the event that the countdown has not reached zero, the player presses the starting controller 222 in step 920, thereby initiating another play of the slot machine 102. In the event that the countdown has reached zero, the CPU 210 generates a signal indicating that the flat rate play session has concluded. The slot machine 102 displays a message indicating this to the player and, in step 922, stores the end time of the session in the time audit data field 518 of the flat rate database.

In an alternate embodiment, the player selected price parameters include the "time between plays." In this embodiment, the CPU 210 of slot machine 102 controls the time between generating outcomes of successive plays in the slot machine 102 to equal the received "time between plays" player selected price parameter. In another alternate embodiment, the slot machine 102 tracks the number of plays during the flat rate play session. If the number of plays exceeds a predetermined limit, the slot machine 102 automatically terminates the flat rate play session, regardless of the duration of the flat rate play session.

Figure 10:
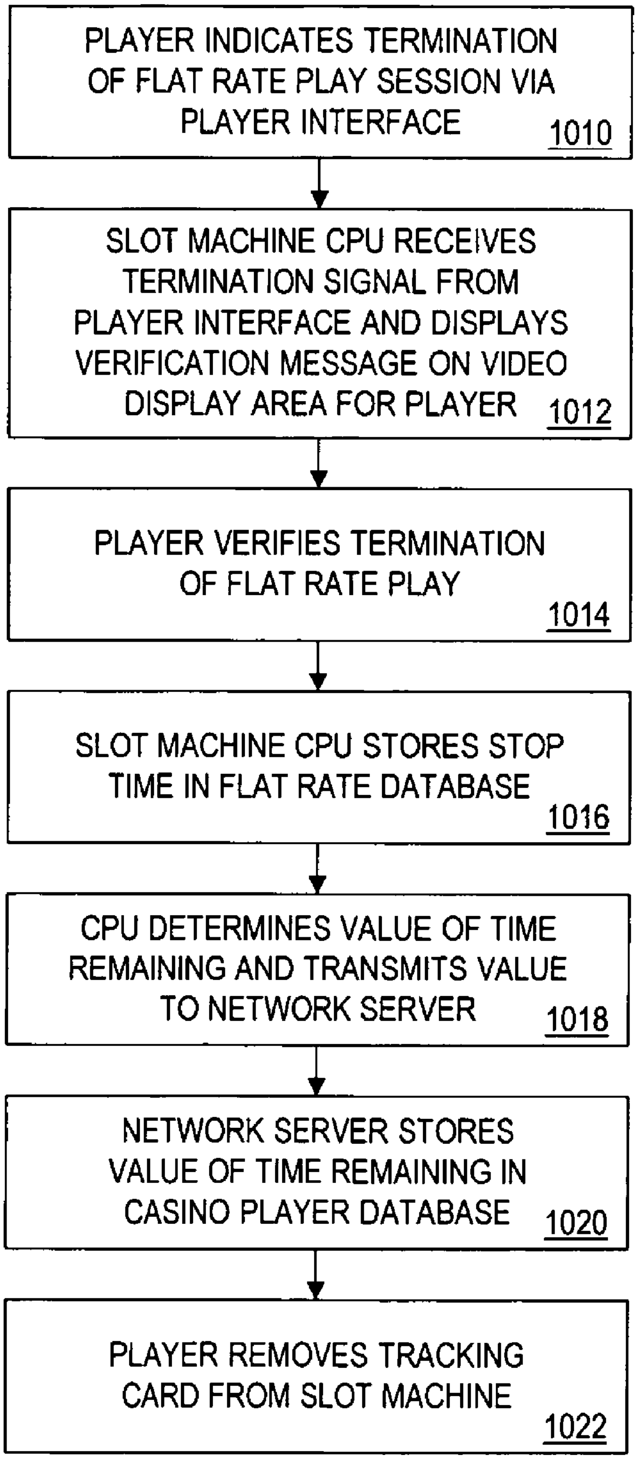
FIG. 10 is a flow diagram of the process of terminating play of the system of FIG. 1.

Turning now to FIG. 10, the operation of the system 100 when the player terminates the flat rate play session prior to the expiration of the session will be described. In step 1010, the player indicates a desire to terminate the flat rate play session via the player interface 264. Consequently, the slot machine 102 CPU 210 receives a termination signal and, in step 1012, displays a message to the player, asking the player to verify termination of the flat rate play session. If the player does not verify termination, then the session continues as described above with reference to FIG. 9. On the other hand, if the player verifies termination, shown as step 1014, the CPU 210 proceeds to store the stop time in the time audit data field 518 of the flat rate database 246 in step 1016.

It is to be understood that having both the start time and the stop time of the flat rate play sessions stored in the flat rate database 246 allows the casino to perform an audit of the session. Specifically, should a player allege that the flat rate play session was shorter than that which was paid for, the casino may access the flat rate database 246 and retrieve the actual start and stop time from the time audit data field 520. In the present embodiment, this time includes an indication of the day, hour, and minute of the play session.

Next, in step 1018, CPU 210 determines the value of the interval remaining in the flat rate play session and transmits the value to the server 106. In order to determine the value of the interval remaining, the CPU 210 accesses the calculation table 227. The value of interval remaining will equal the flat rate price 724 corresponding to the price parameters (i.e., the machine type 710, amount wagered per play 712, player status rating 714, time of day 716, etc.) used to determine the original flat rate price charged to the player. When determining the value of the interval remaining, however, the value in the length of flat rate play session field 722 is not the original length of the session, but rather is equal to the actual interval remaining in the flat rate play session. Stated succinctly, the slot machine 102 identifies the flat rate price 724 corresponding to the actual interval remaining in the flat rate play session.

Once the value of interval remaining is determined, the slot machine 102 transmits the value to the slot network server 106. Upon receiving the value of interval remaining, the server 106 stores the value in field 430 of the casino player database 344 in the player's record, as identified by the player ID number 410. Storing the value is shown as step 1020. Finally, in step 1022, the player removes the player tracking card.

Figure 11A:
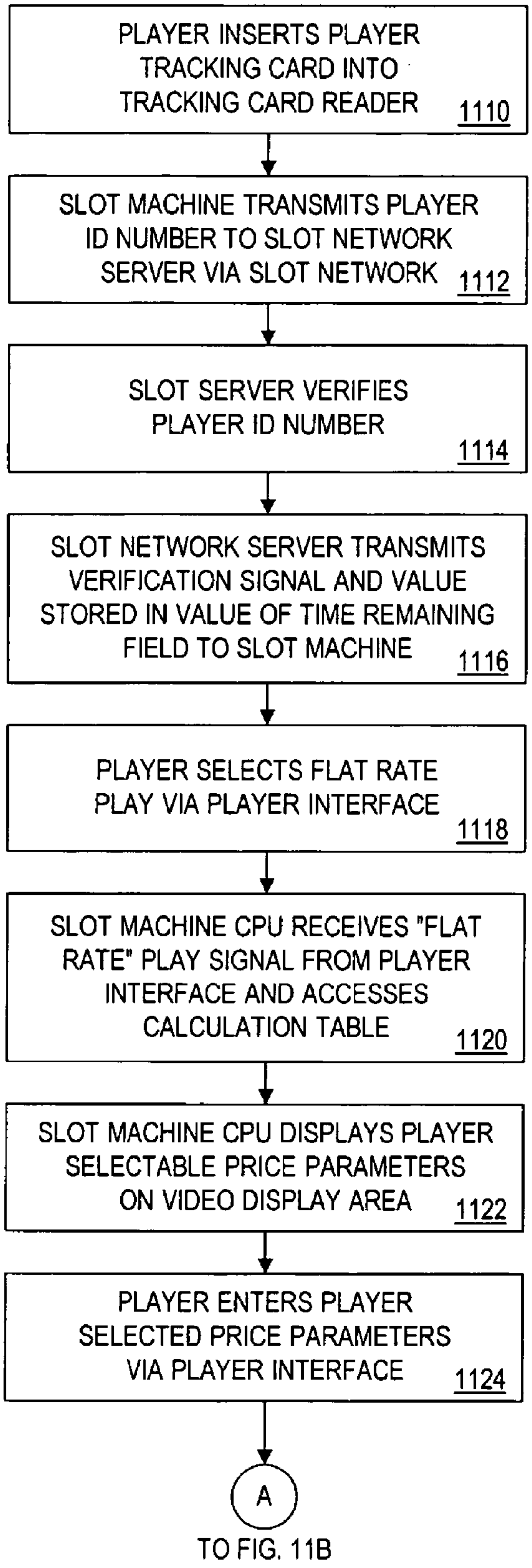
FIGS. 11*a* and 11*b* are flow diagrams of the process of resuming play of the system of FIG. 1.
Figure 11B:
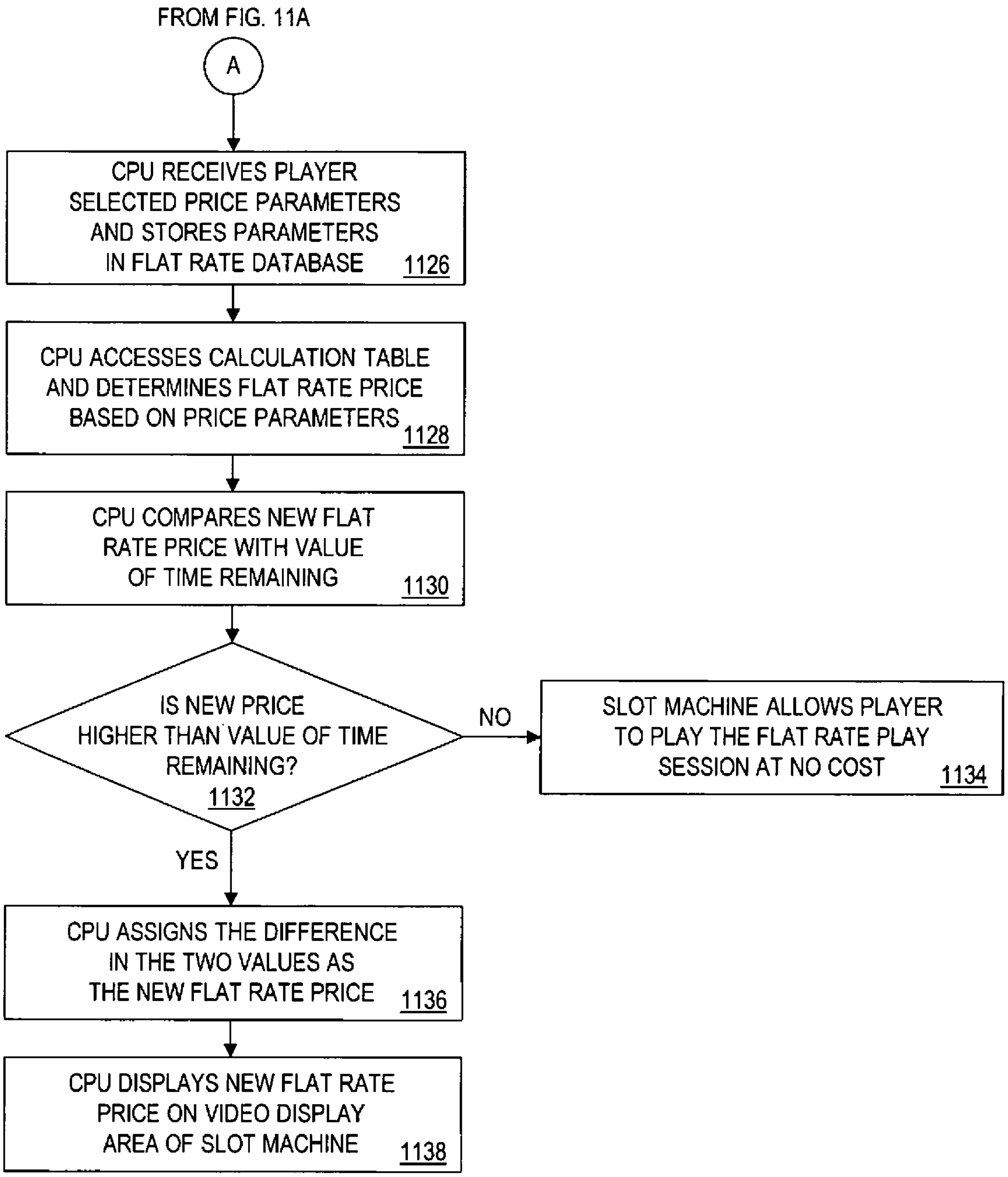

The process of resuming play at another slot machine 102 will now be described with reference to FIGS. 11*a* and 11*b*. The initial operation of the system 100, as indicated by steps 1110-1128, proceeds generally as described above with reference to steps 810-828 of FIGS. 8*a* and 8*b*.

However, once the CPU 210 of slot machine 102 determines a new flat rate price based on the relevant price parameters, the CPU 210 determines whether the player must deposit additional funds.

Specifically, in step 1130, the CPU 210 compares the new flat rate price 724 with the value of interval remaining 430. The server 106 transmits the value of interval remaining 430, as stored in the casino player database 344, to the slot machine 102 in step 1116 so that the comparison may be performed. As indicated by step 1132, the comparison involves determining whether the new flat rate price 724 is higher than the value of interval remaining 430.

If the new price 724 is not higher than the value of interval remaining 430, then, in step 1134, the slot machine allows the player to play the flat rate session at no cost. However, if the new flat rate price 724 is higher than the value of interval remaining 430, then, in step 1136, the CPU 210 assigns the difference in the two values as the new flat rate price. Thus, in step 1138, the CPU 210 displays the new flat rate price on the video display area 238 of the slot machine 102. Thereafter, operation of the system continues as described above with reference to steps 832-836 of FIG. 8*b*.

In an alternate embodiment, when a player terminates the flat rate session early, the value of the interval remaining is added to the player's credit balance, as stored in field 422 of the casino player database 344. In yet another embodiment, by terminating early, a player may forfeit this value.

Figure 12A:
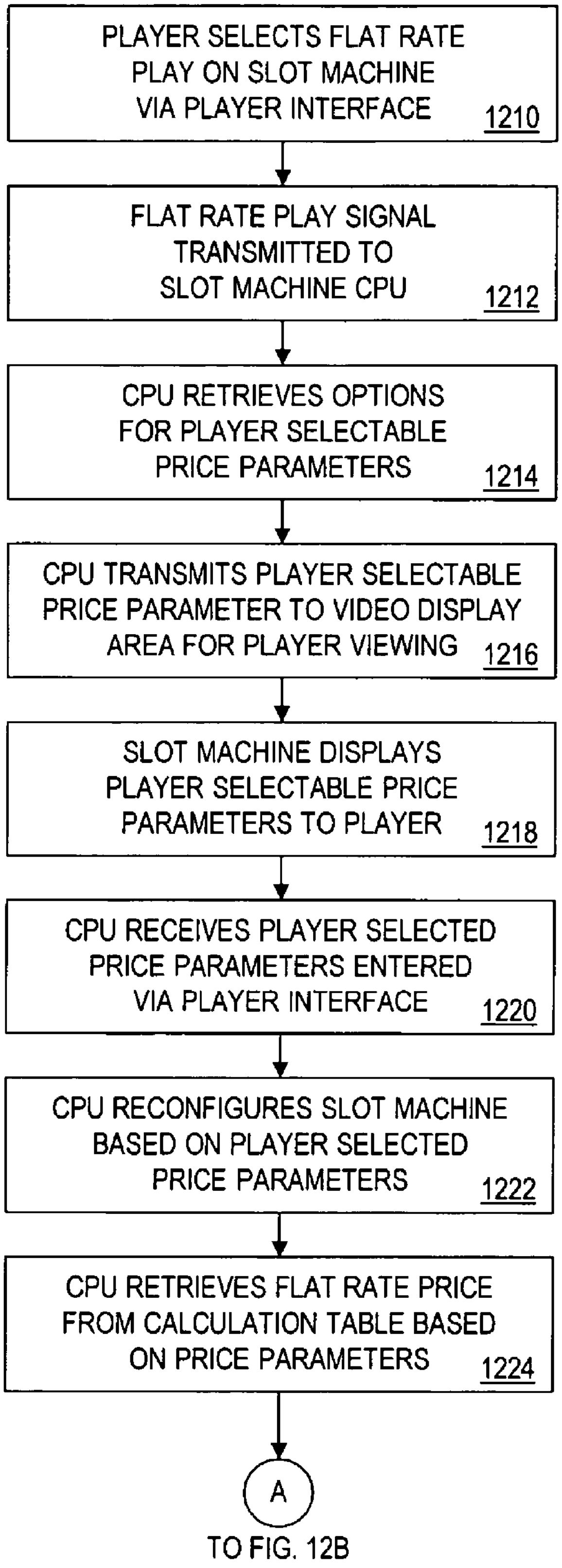
FIGS. 12*a* and 12*b* are overall flow diagrams of the operation of another embodiment of the present invention.
Figure 12B:
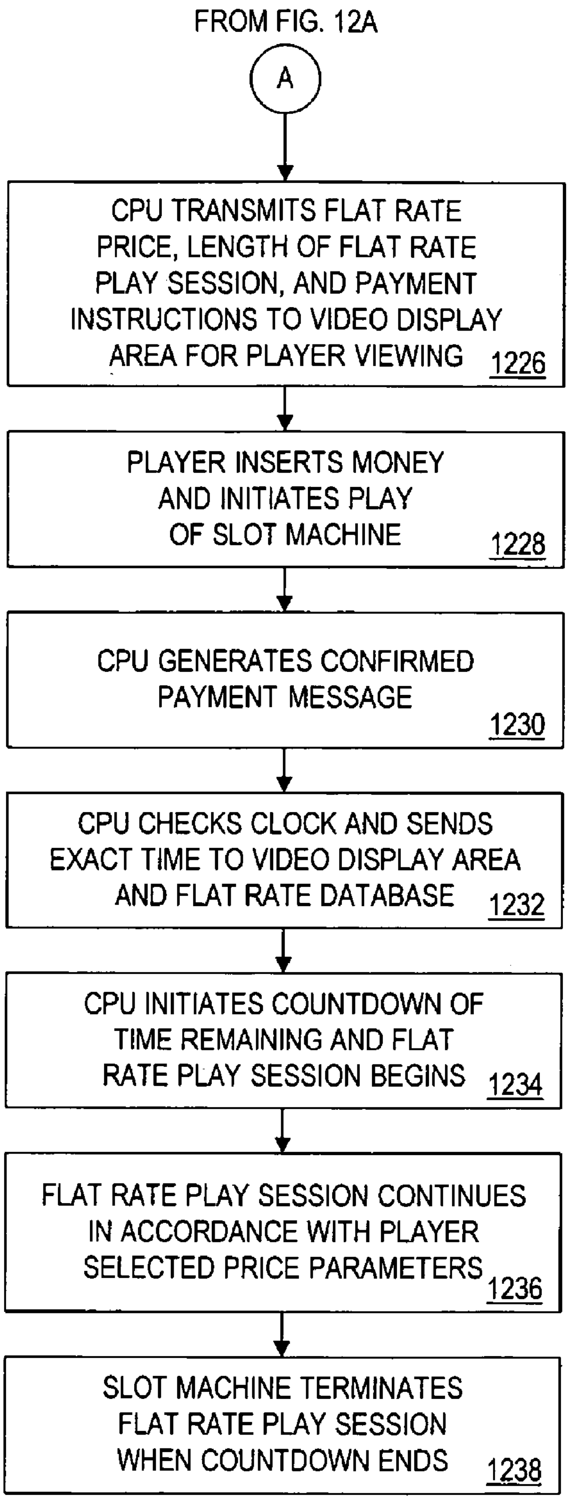

It is to be understood that an embodiment of the present invention need not include both a slot machine and slot network server. For example, an embodiment employing only a slot machine 102 is within the scope of the present invention. Such an embodiment will now be described with reference to FIGS. 12*a*, 12*b*, and 13, and continuing reference to FIGS. 2, 5, and 7. Such an embodiment utilizes the slot machine 102 of FIG. 2.

Initially, the player selects flat rate play on the slot machine 102 in step 1210 (e.g., by selecting an option represented by video display area 238). Once the player selects flat rate play, the flat rate play signal is transmitted from the player interface 264 to the CPU 210 in step 1212. The CPU 210 then proceeds, in step 1214, to retrieve the player options for selectable price parameters. Then, in step 1216, the CPU 210 transmits the player selectable price parameter options to the video display area 238 for viewing.

Once the player selectable price parameter options have been displayed to the player, the player inputs the player selected price parameters through the player interface 264. Then, in step 1220, the CPU 210 receives the player selected price parameters from the player interface 264. Alternately, as described in detail herein, the player may select a predefined package of casino-specified price parameters.

Once the CPU 210 receives the player selected price parameters (or, as would be understood based at least on the "predetermined package" embodiment described herein) receives the selection of a predefined package), the CPU 210 reconfigures the slot machine 102. Specifically, the CPU 210 generates a signal, or a flag in memory, indicating that there is no need to accept the coins between plays. CPU 210 further sets the pay combination status field 650 in the payout table 228 according to the jackpot structure entered by the player. In an alternate embodiment in which the player selectable price parameters include the time between the handle pulls, the CPU 210 sets an internal timer.

Furthermore, once the slot machine 102 CPU 210 receives the player selected price parameters, it proceeds to access the calculation table 227. By accessing the calculation table 227, the CPU 210 retrieves the flat rate price for the flat rate play session. Retrieving the flat rate price is shown as step 1224. Once the CPU 210 retrieves the flat rate price, it proceeds to transmit the price, the length of the flat rate play session, and payment instructions to the video display area 238 for player viewing in step 1226.

In step 1228, the player reads the data and instructions on the video display area 238 and inserts money into the coin acceptor 248 or a bill acceptor (not shown) in order to initiate play of the slot machine 102. In an alternate embodiment, the player enters a stored value card such as a "smart card" into the card reader 266. Such a smart card has the players credit balance stored thereon. Payment using a smart card further entails the CPU 210 debiting the player's balance on the smart card by the amount of the flat rate price. Further, the player may enter a credit card into the card reader 266.

In step 1230, the CPU 210 generates a confirmed payment message indicating that the player has deposited sufficient funds to cover the flat rate price. Consequently, the CPU 210, in step 1232, sends the current time to both the video display area 238 and the time audit field 518 of flat rate database 246. Next, in step 1234, the CPU 210 initiates the countdown of the interval remaining in the flat rate play session as stored in field 516. The length of the flat rate play session received from the player is initially stored in field 516. The slot machine 102 decrements, or counts down, this value as the flat rate play session begins.

As shown in step 1236, the flat rate play session continues in accordance with the player selected price parameters, if such parameters affect play, in step 1236. During such play, the CPU 210 stores and updates the player's accumulated credits in RAM 218. In an alternate embodiment, the slot machine pays out jackpots as they occur. Finally, in step 1238, the CPU 210 terminates the flat rate play session when the countdown ends.

In an alternate embodiment, the interval of the flat rate play session is not a time period, but rather is a maximum number of plays. In such an embodiment, the slot machine 102 stores the number of plays in the flat rate database 246, as described previously in FIG. 9, and, in step 916, increments a counter for each outcome generated. The counter may be implemented in either software or hardware. Furthermore, in step 918, the slot machine 102 compares the number of plays stored in the flat rate database 246 to the value of the counter. If the value of the counter equals the stored number of plays, then the flat rate play session is terminated.

Figure 13:
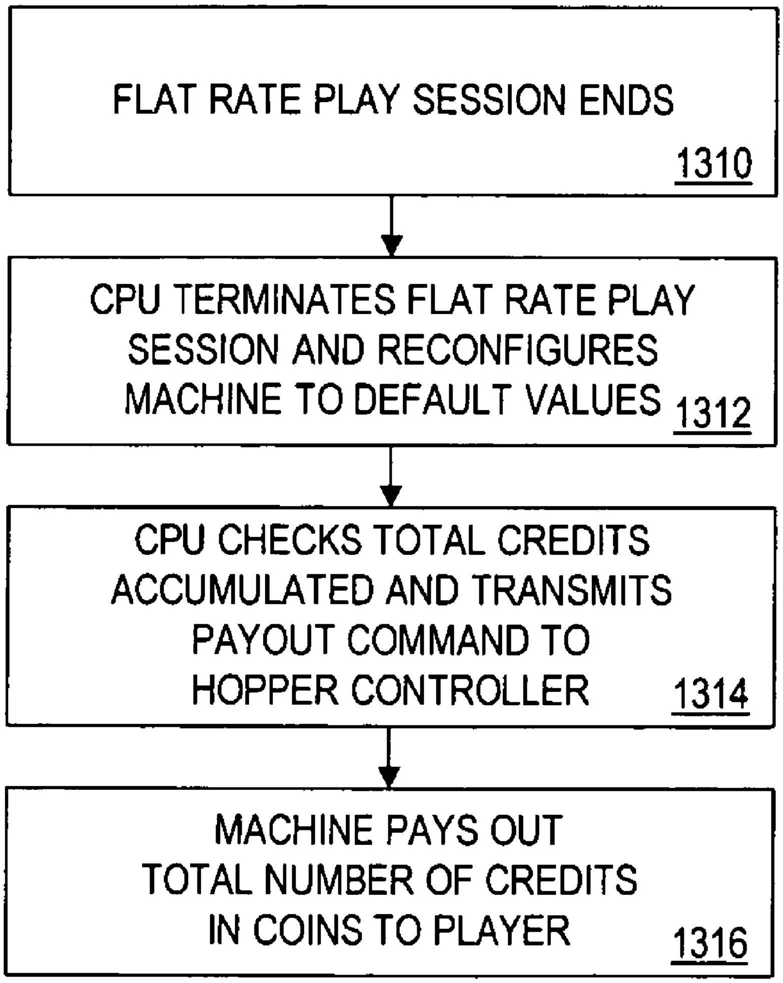
FIG. 13 is a flow diagram of the process of receiving a payout in the embodiment of FIG. 12.

Turning now to FIG. 13, the process of receiving a payout from the present embodiment will be described. As shown as step 1310, the flat rate play session ends upon the termination of the countdown. Specifically, as shown in step 1312, the slot machine 102 CPU 210 terminates the flat rate play session by reconfiguring the slot machine 102 to its default values. For example, the CPU 210 resets the pay combination status field 650 in the payout table 228 to reflect the original jackpot structure. The CPU 210 also generates a signal indicating that coins must be received for each play. In short, the player selected price parameters are no longer in effect.

In step 1314, the CPU 210 checks the total credits accumulated, as stored in the RAM 218, and transmits a payout command to the hopper controller 240. Consequently, in step 1316, the slot machine 102 pays out the total number of credits to the player.

Figure 15:
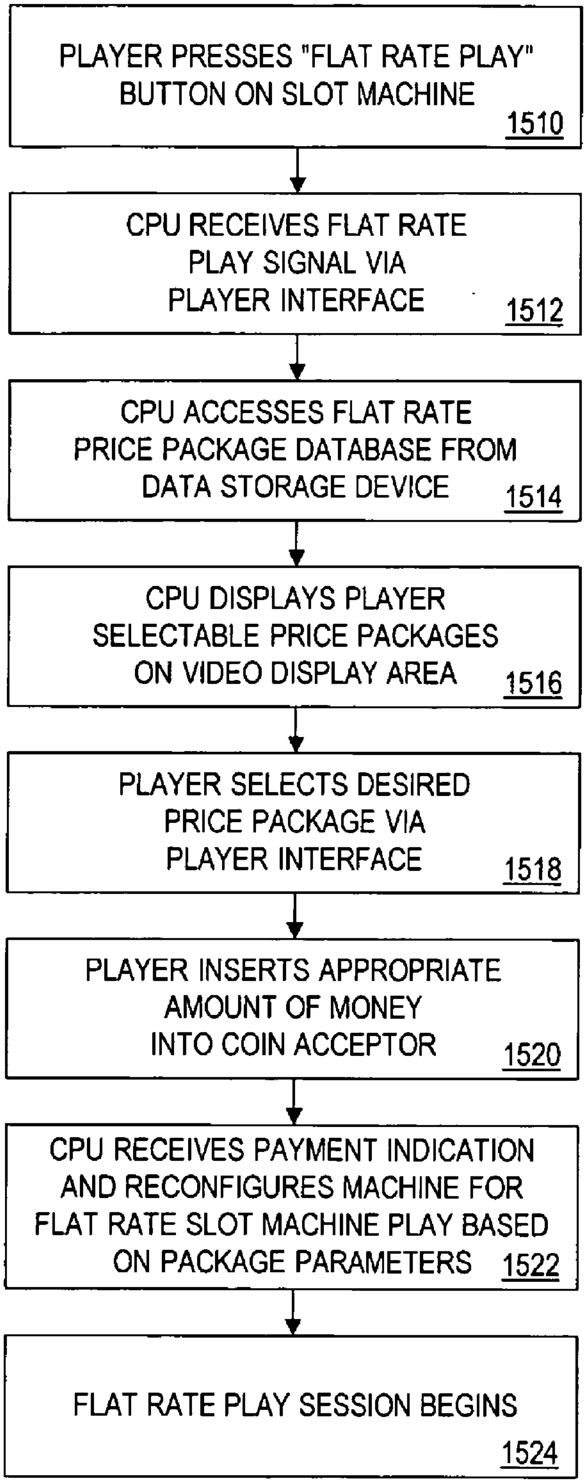
FIG. 15 is an overall flow diagram of the operation of another embodiment of the present invention.

An alternate embodiment of the present invention will now be described with reference to FIG. 15. The operation of slot machine 100, as indicated by steps 1510-1524 below, proceeds generally as described with reference to FIG. 14. In this embodiment, the player selects from a list of casino determined price packages, rather than choosing individual price parameters. Each price package, as stored in the flat rate price package database 229 described above, is a combination of different price parameters which correspond to a flat rate play session price.

In step 1510, the player presses a "flat rate play" button on the slot machine 100 (or, as would be understood to be an equivalent mechanism by one of ordinary skill in the art of input devices for gaming devices, sends a signal using touch-sensitive video display area 238). The slot machine 102 CPU 210 receives flat rate play signal from the player interface 264 in step 1512. In this case, the player interface is an actual "flat rate play" button located on the outside of the slot machine 100. Next, in step 1514, the CPU 210 access flat rate price package database 229 from data storage device 224. The CPU 210 then displays the player selectable price packages on video display area 238 in step 1516. It is to be understood that the CPU 210 need not display the packages on the video display area 238, as those package options could be displayed elsewhere on the body of the slot machine 100. Alternatively, player interface 264 could incorporate several "flat rate play" buttons, each representing a different flat rate price package.

Next, in step 1518, the player selects the desired price package via the player interface 264. Having already seen what the price of the selected package is, the player then deposits the appropriate amount of money into coin acceptor 248 (or inputs monetary value into another mechanism for inputting monetary value into the slot machine) in step 1520. For example, the player may have chosen price package four which costs fifty dollars. In return for fifty dollars deposited into the slot machine, the player receives two hundred and fifty handle pulls, with three coins wagered per pull, and with the top three jackpots active in his flat rate play session. These parameters are specified in the flat rate price package database 229.

In step 1522, the CPU 210 receives an indication of payment from the coin acceptor 248 (or other mechanism for accepting monetary value from a player) and reconfigures the parameters of slot machine 100 to meet the specifications of the flat rate price package selected by the player. Finally, in step 1524, flat rate play begins.

It is noted that the flat rate price package database 229 could be located at the slot network server 106 and not at each individual slot machine 100. When it is located at the server, certain casino or operator selected parameters could be used to determine the price. For example, there could be different flat rate price packages for different times during the day which are based on projected or actual casino traffic and/or slot machine usage.

As will be appreciated by one of ordinary skill in the art, the key step in getting players to wager money on gaming devices, such as slot machines, is to bring the players to the casino floor. One way in which casinos can bring additional players to the casino floor, and thereby increase total revenues, is by giving away free samples or rewards with a minimum displacement of traditional pay-per-play players. The present invention may be employed for such a purpose.

In one embodiment, for example, the casino could declare a free-play period. During the free-play period, likely chosen by the casino to correspond to down time, when most gaming devices are idle, players insert their player tracking cards into the gaming devices and initiate play without being charged. Specifically, the casino programs the calculation table 227 so that the flat rate price 724 is zero for a given time of day 716 and day of the week 718. It is anticipated that during such a free-play period, the casino will alter the jackpot structure, causing only a selected jackpot to be active. Thus, the lure of free jackpots will bring additional players to the casino floor who will likely continue playing after the free-play period ends. A further benefit of this embodiment is that it would incent players to become slot club members. This would result in an increase of players who return to the casino and the customer base which the casino markets to through mailings.

It is also to be understood that play of the slot machines during the free-play period need not occur as described above. Thus, in an alternate embodiment, the reels 232, 234, 236 of the slot machines 102 continuously spin, regardless of whether a player has inserted a tracking card, with the server 106 periodically signaling a jackpot on a random machine. Only when a player has inserted a player tracking card is the jackpot awarded. The server 106 randomly selects a machine ID number and, if the machine 102 is not being played by a pay-per-play player, the server 106 transmits a signal to that slot machine 102 directing it to produce a winning outcome.

In an alternate embodiment that achieves substantially the same result of attracting additional players to the floor during down times, the casino issues guests a player tracking card or a smart card having a predetermined free credit balance associated therewith. The casino could then restrict the day and time in which the players could use the free card in a flat rate play session. In another embodiment, the cards provided to guests contain an indication of time, rather than money, for use during a flat rate play session.

Although the foregoing embodiments employ static jackpot structure, which stay the same throughout the flat rate play session, it is within the scope of the present invention to employ dynamic jackpot structures, which change during the flat rate play session. In one such embodiment, the dynamic jackpot structure starts with a given number of active jackpots, as indicated in the pay combination status field 650 of the payout table 228. As the flat rate play session progresses, the number of active jackpots changes. Specifically, as the interval remaining in the flat rate play session decreases, fewer pay combinations are made active. In other words, the slot machine 102 CPU 210 monitors the time and, every fifteen minutes, for example, causes the pay combination status field 650 to change from "active" to "inactive" for a given pay combination 610. Alternatively, the CPU 210 changes the pay combination status field 650 after a predetermined number of plays.

As will be appreciated by those skilled in the art, a dynamic jackpot structure based on the time progression of the flat rate play session can increase the revenue generated by the slot machines 102. Specifically, such a dynamic jackpot structure could be used with a flat rate play session whose duration is not a fixed time, but rather a given number of plays. Because fewer jackpots will be active as time progresses, players have an incentive to use their fixed number of plays within a short time period. Stated succinctly, the present invention increases speed of play.

In another embodiment, the jackpot structure is dynamic based not on the progression of the flat rate play session, but rather on the outcomes generated by the slot machine 102. One such embodiment involves changing a particular jackpot from "active" to "inactive" upon a player hitting the outcome corresponding to that pay combination. For flat rate play session whose duration is not a fixed time, but rather a given number of plays. Because fewer jackpots will be active as time progresses, players have an incentive to use their fixed number of plays within a short time period. Stated succinctly, the present invention increases speed of play.

In another embodiment, the jackpot structure is dynamic based not on the progression of the flat rate play session, but rather on the outcomes generated by the slot machine 102.

One such embodiment involves changing a particular jackpot from "active" to "inactive" upon a player hitting the outcome corresponding to that pay combination. For flat rate play session whose duration is not a fixed time, but rather a given number of plays. Because fewer jackpots will be active as time progresses, players have an incentive to use their fixed number of plays within a short time period. Stated succinctly, the present invention increases speed of play.

In another embodiment, the jackpot structure is dynamic based not on the progression of the flat rate play session, but rather on the outcomes generated by the slot machine 102. One such embodiment involves changing a particular jackpot from "active" to "inactive" upon a player hitting the outcome corresponding to that pay combination. For example, a player may begin the flat rate play session with all jackpots active. On one play, the slot machine 102 generates a "CHERRY-CHERRY-CHERRY" outcome 610. Upon accessing the payout table 228, the CPU 210 determines that ten coins are to be paid out, credits the players accumulated credits accordingly, and causes the pay combination status field 650 corresponding to the "CHERRY-CHERRY-CHERRY" outcome 610 to change from "active" to "inactive". Thus, a player can only hit a given jackpot once. As will be appreciated by those skilled in the art, such a dynamic jackpot structure will allow slot machine operators to further discount the flat rate price to attract additional players. Furthermore, it is anticipated that players will be willing to forego hitting the same jackpot multiple times because their focus is typically on hitting the highest jackpot once.

These and other dynamic jackpot structures may be implemented as either a player selected price parameter or an operator selected price parameter. When implemented as a player selected price parameter, the dynamic jackpot structure is displayed to the player as a player selectable price parameter option. The player, in turn, selects it via the player interface 264. When implemented as an operator selected price parameter, the dynamic jackpot structure is displayed for player viewing prior to player approval of the flat rate price. Whether the price parameters are selected by the player or the casino operator, the dynamic jackpot structure affects the flat rate price generally as described above, namely, as a field in the calculation table 227 or as a variable in the price algorithm.

In accordance with one embodiment, a player may be provided with an opportunity to extend a flat rate play session that would otherwise be considered to have concluded. For example, if it is determined that a duration of a flat rate play session has come to an end (e.g., the countdown of the time, outcomes or winning outcomes purchased via the flat rate play session has reached zero), the player may be provided with an opportunity to extend the flat rate play session. For example, the player may be provided with an opportunity to provide additional montetary value and/or other consideration in exchange for an additional period of time, additional outcomes to be added to the flat rate play session. Of course, a player may be provided with such an opportunity to extend a flat rate play session at times other than the end or conclusion of the flat rate play session. For example, as a flat rate play session is coming to an end (e.g., only 20 of 500 hands of video poker remain in the flat rate play session), an offer may be output to a player to extend the flat rate play session. For example, the offer may comprise the following or like message "Would you like to play an additional 50 hands of video poker? If so, simply insert another $2.00."

In some embodiments, such an offer may be based on events that have occurred during the flat rate play session. For example, the content of the message may be customized based on whether the player is or has recently experienced a winning streak (e.g., a predetermined number or percentage of outcomes received by the player are winning outcomes within a predetermined period of time) or losing streak. For example, the message may be the following or like message: "You're on a roll! Eight of your last ten hands have been winning hands but your session is almost done! Do you want to extend your session to continue your luck? If so, press yes."

As described, in some embodiments a player may be required to provide some consideration in exchange for extending a flat rate play session. For example, a price for extending a flat rate play session may be calculated based on the expected value of the extension (e.g., based on any of the factors described herein). In one embodiment, a player may be allowed to extend a flat rate play session without being required to provide any additional consideration (e.g., the player may "win" an extension, be provided an extension as a gift, be provided an extension if the player's behavior satisfies one or more predetermined criteria, etc.). In one embodiment, a player may be provided an opportunity to provide consideration other than monetary value in exchange for extending a flat rte play session. For example, a player may be provided an opportunity to extend a flat rate play session in exchange for (i) performing an activity; and/or (ii) committing to perform an activity in the future. It should be noted that the latter may be associated with a penalty if the player fails to perform the activity in accordance with the commitment. Such a penalty may comprise, for example, charging the player a price for the extension of the flat rate play session and/or withholding a payout from the player. An activity that a player may perform or commit to perform in exchange for extending a flat rate play session may comprise, for example, (i) answering one or more survey questions (e.g., for a casino or other entity), (ii) eating dinner at a restaurant associated with a casino, (iii) making a purchase from a retailer associated with the casino; (iv) listening to and/or viewing an advertisement, (v) gamble for a predetermined amount of time, (vi) gambling on a specified gaming device, type of gaming device, or game, etc.; and/or (vi) providing information on at least one other player or potential player (e.g., provide an e-mail address of a friend who may be interested in purchasing a flat rate play session).

An extension of a flat rate play session may be similar (e.g., may define one or more parameters in a similar manner) to the flat rate play session the player has completed or is in the process of completing. In some embodiments, one or more of the following elements may be dissimilar among an extension of a flat rate play session and the flat rate play session as originally purchased: (i) the extension may be of shorter duration (e.g., a 10-minute extension may be available after a 30-minute flat rate play session concludes), (ii) the extension may have a different price (e.g., if the duration is shorter, the price may be lower), and/or (iii) the player may be allowed to begin the extension period with the credit balance (positive or negative) carried over from the previous flat rate play session. Thus, the duration and starting balance of the extension may influence its price. For example, if a player's balance at the end of a flat rate play session is considerably negative (e.g., −200 credits), the extension duration may be short (e.g., five minutes), and a term or condition of the extension may stipulate that the player must begin with the ending balance of the previous flat rate play session. Additionally, the extension may be provided at a relatively low price (or even for free). In another example, if the player's balance at the end of a flat rate play session is considerably negative (e.g., −200 credits), and the extension duration is short (e.g., five minutes), the player may be sold an extension with a starting balance of zero (e.g., "resetting" the player's balance), albeit for a greater price. In a further example, a player with a positive balance may be given the option of (i) keeping the winnings, and purchasing an extension for a first price, or (ii) forfeiting the winnings, and purchasing an extension for a reduced price. The cost of the flat rate play session and prices of such extensions may then be calculated in a manner similar to that described previously.

It should be understood that, in some embodiments, a player may request an extension of time for a flat rate play session, in addition to or in lieu of being offered the extension without first having to make such a request.

It should further be understood that, in some embodiments, an offer for an extension of a flat rate play session may only be output (whether in response to a player request for such an offer or otherwise) if the player associated with the flat rate play session qualifies for the offer. For example, in some embodiments extension of flat rate play sessions (or extensions defining certain parameters) may only be made available to players who are associated with a certain status, who are members of a casino loyalty club, who have completely satisfied the requirements of a flat rate play session, who have maintained at least a minimum rate of play during a flat rate play session and/or who have otherwise satisfied a pre-requisite for being offered an extension of a flat rate play session.

Although the foregoing preferred embodiments employ slot machines, it is within the scope of the present invention to employ other types of gaming devices, such as video poker machines, video roulette machines, and the like. For example, in an embodiment using a video poker machine, the player selected price parameters include identifying only specific card hands, such as a royal flush, as active in the jackpot structure.

Thus, while the present invention has been described in terms of certain preferred embodiments, other embodiments that are apparent to those of skill in the art are also intended to be within the scope of the present invention. Accordingly, the scope of the present invention is intended to be limited only by the claims appended hereto.

What is claimed is:

1. A method of operating a gaming device, said method comprising:

causing the gaming device to display an indication of at least one flat rate price package, each flat rate price package defining at least one predetermined price parameter applicable during at least one flat rate play session, each flat rate play session including a plurality of plays of a wagering game, wherein each play of the wagering game is associated with (i) a wager amount and (ii) a non-zero probability of resulting in an award greater than zero;

receiving a selection at the gaming device of one of the at least one flat rate price package, thereby determining a selected flat rate play session;

after said selection of one of the at least one flat rate price package, receiving a payment at the gaming device corresponding to a session price associated with the selected flat rate play session, the session price being based on the at least one predetermined price parameter of the selected flat rate play session and being less than a cumulative total of the wager amounts associated with each of the plurality of plays of the wagering game of the selected flat rate play session;

enabling play of the plurality of plays of the wagering game of the selected flat rate play session in exchange for receiving the session price without requiring a player to risk any further funds associated with the plurality of plays of the wagering game other than the session price; and causing the gaming device to provide any payout for the selected flat rate play session based on each of the plurality of plays of the wagering game which result in an award greater than zero.

2. The method of claim 1, wherein the at least one price parameter includes at least one selected from the group consisting of: an amount wagered per play, a jackpot structure, a flat rate play session duration, a time of day, a day of a week, a day of a year, a gaming device availability measurement, and a type of gaming device.

3. The method of claim 1, wherein the at least one price parameter is set by an entity other than the player prior to causing the gaming device to display the indication of the at least one flat rate price package.

4. The method of claim 1, wherein causing the gaming device to display the indication of the at least one flat rate price package includes causing the gaming device to display a graphic representation of the at least one flat rate price package in a video display area of the gaming device.

5. The method of claim 1, wherein causing the gaming device to display the indication of the at least one flat rate price package includes causing the gaming device to display an association of at least one physical button with the at least one flat rate price package.

6. The method of claim 1, wherein receiving the selection at the gaming device includes receiving an input via at least one selected from the group consisting of: a touch-sensitive video display area and a physical button.

7. The method of claim 1, wherein enabling play of the plurality of plays of the wagering game of the selected flat rate play session includes causing the gaming device to conduct the plurality of plays of the wagering game for a duration defined by the selected flat rate play session in exchange for receiving the session price without requiring the player to risk any further funds associated with any of said plurality of plays.

8. The method of claim 1, wherein each of the at least one flat rate price package includes a different session price, each different session price being based on at least one price parameter of the flat rate price package to which that price corresponds, the at least one price parameter selected from the group consisting of: (i) an interval between plays of the wagering game; (ii) a duration of the flat rate play session; (iii) an amount wagered per play of the wagering game; and (iv) a pay combination status.

9. The method of claim 1, further comprising:

receiving at the gaming device an indication from the player that the player desires to initiate flat rate play;

accessing a memory of the gaming device to determine the at least one flat rate price package available for selection by the player; and causing the gaming device to display the indication of the at least one flat rate price packaged determined by accessing the memory.

10. The method of claim 1, further comprising:

determining that a duration associated with the selected flat rate play session has elapsed; and after determining that the duration associated with the selected flat rate play session has elapsed, terminating the plurality of plays of the wagering game of the selected flat rate play session.

11. The method of claim 1, further comprising:

determining whether to display an offer for an extension of the selected flat rate play session; and if the determination is to display the offer for the extension of the selected flat rate play session, causing the gaming device to display the offer for the extension of the selected flat rate play session.

12. The method of claim 11, wherein determining whether to display the offer for the extension of the selected flat rate play session comprises determining that the player requested the offer.

13. The method of claim 11, wherein determining whether to display the offer for the extension of the selected flat rate play session comprises determining that the player qualifies for the offer.

14. The method of claim 11, further comprising determining at least one parameter associated with the extension of the selected flat rate play session, the at least one parameter defining, at least in part, an amount of consideration to be provided by the player in exchange for the extension.

15. The method of claim 11, further comprising:

determining whether at least one designated event occurred during play of the flat rate play session; and if the determination is that the at least one designated event occurred during play of the flat rate play session, customizing the offer for the extension of the selected flat rate play session based on the at least one designated event.

16. A gaming device comprising:

at least one input device;

at least one display device;

at least one processor; and at least one memory device which stores a plurality of instructions, which when executed by the at least one processor, cause the at least one processor to operate with the at least one input device and the at least one display device to:

display an indication of at least one flat rate price package, each of the at least one flat rate price package defining at least one predetermined price parameter applicable during at least one flat rate play session, each flat rate play session including a plurality of plays of the wagering game, wherein each play of the wagering game is associated with (i) a wager amount and (ii) a non-zero probability of resulting in an award greater than zero;

enable a player to input a selection of one of the at least one flat rate price package, thereby determining a selected flat rate play session;

after enabling the player to input the selection of one of the at least one flat rate price package, enable the player to provide a payment corresponding to a session price associated with the selected flat rate play session, the session price being based on the at least one predetermined price parameter of the selected flat rate play session and being less than a cumulative total of the wager amounts associated with each of the plurality of plays of the wagering game of the selected flat rate play session;

enable play of the plurality of plays of the wagering game of the selected flat rate play session in exchange for receiving the session price without requiring a player to risk any further funds associated with the plurality of plays of the wagering game other than the session price; and provide any payout for the selected flat rate play session based on each of the plurality of plays of the wagering game which result in an award greater than zero.

17. The gaming device of claim 16, which is a video poker device, wherein the plurality of instructions, when executed by the at least one processor, cause the at least one processor to operate with the at least one input device and the at least one display device to enable a plurality of plays of a video poker game on the video poker device.

18. The gaming device of claim 16, wherein the at least one display device includes a video display area associated with a touch screen controller and wherein the plurality of instructions, when executed by the at least one processor, cause the at least one processor operate with the video display area and the touch screen controller to display the indication of the at least one flat rate price package and to receive the selection of the at least one flat rate price package.

19. A non-transitory computer readable storage medium encoded with a plurality of instructions which, when executed by at least one processor, cause the at least one processor to:

cause a gaming device to display an indication of at least one flat rate price package, each flat rate price package defining at least one predetermined price parameter applicable during at least one flat rate play session, each flat rate play session including a plurality of plays of a wagering game, wherein each play of the wagering game is associated with (i) a wager amount and (ii) a non-zero probability of resulting in an award greater than zero;

enable a player to input a selection of one of the at least one flat rate price package, thereby determining a selected flat rate play session;

after enabling the player to input the selection of one of the at least one flat rate price package, enable the player to provide a payment corresponding to a session price associated with the selected flat rate play session, the session price being based on the at least one predetermined price parameter of the selected flat rate play session and being less than a cumulative total of the wager amounts associated with each of the plurality of plays of the wagering game of the selected flat rate play session;

enable play of the plurality of plays of the wagering game of the selected flat rate play session in exchange for receiving the session price without requiring a player to risk any further funds associated with the plurality of plays of the wagering game other than the session price; and cause the gaming device to provide any payout for the selected flat rate play session based on each of the plurality of plays of the wagering game which result in an award greater than zero.

20. The computer readable storage medium of claim 19, wherein the at least one processor is disposed within the gaming device.

21. The method of claim 1, wherein the at least one predetermined price parameter includes at least one duration of at least one flat rate play session.

22. The method of claim 21, wherein each of the at least one duration is a predetermined period of time, each predetermined period of time spanning a plurality of plays of the wagering game.

23. The method of claim 22, wherein at least one predetermined period of time comprises a predetermined quantity of units of time.

24. The method of claim 23, wherein each unit of time is a quantity of minutes.

25. The method of claim 24, wherein the selected flat rate play session is associated with one of the at least one duration, and wherein the plurality of instructions, when executed by the at least one processor, cause the at least one processor to decrement the duration associated with the selected flat rate play session during play of the plurality of plays of the wagering game of the selected flat rate play session.

26. The gaming device of claim 16, wherein the at least one predetermined price parameter includes at least one duration of at least one flat rate play session.

27. The gaming device of claim 26, wherein each of the at least one duration is a predetermined period of time, each predetermined period of time spanning a plurality of plays of the wagering game.

28. The gaming device of claim 27, wherein at least one predetermined period of time comprises a predetermined quantity of units of time.

29. The gaming device of claim 28, wherein each unit of time is a quantity of minutes.

30. The gaming device of claim 29, wherein the selected flat rate play session is associated with one of the at least one duration, and wherein the plurality of instructions, when executed by the at least one processor, cause the at least one processor to decrement the duration associated with the selected flat rate play session during play of the plurality of plays of the wagering game of the selected flat rate play session.

* * * * *